(12) United States Patent
Hembry

(10) Patent No.: US 6,397,203 B1
(45) Date of Patent: May 28, 2002

(54) DEFINING OBJECT CLASSES TO MATCH CORRESPONDING SPECIALIZED DATA TYPES IN A RELATIONAL DATABASE

(75) Inventor: Douglas Michael Hembry, Los Gatos, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/163,505

(22) Filed: Sep. 30, 1998

(51) Int. Cl.[7] .............................. G06F 17/30; G06F 7/00
(52) U.S. Cl. ........................................................ 707/2
(58) Field of Search ................................ 707/103, 2, 4, 707/8, 104, 1–10, 100–104.1, 200–206, 500–542; 395/161, 615, 610, 600, 685; 709/226, 315; 345/355; 370/352; 703/13, 6; 702/186; 714/20, 26; 717/5

(56) References Cited

U.S. PATENT DOCUMENTS

| | | | | |
|---|---|---|---|---|
| 4,930,071 A | | 5/1990 | Tou et al. ................. | 364/300 |
| 5,295,256 A | | 3/1994 | Bapat ....................... | 395/500 |
| 5,297,279 A | * | 3/1994 | Bannon et al. ........... | 395/600 |
| 5,437,027 A | * | 7/1995 | Bannon et al. ........... | 395/600 |
| 5,499,371 A | | 3/1996 | Henninger et al. ...... | 395/700 |
| 5,504,886 A | | 4/1996 | Chang et al. ............ | 395/600 |
| 5,542,078 A | | 7/1996 | Martel et al. ............ | 395/600 |
| 5,550,971 A | * | 8/1996 | Brunner et al. .......... | 395/161 |
| 5,590,327 A | * | 12/1996 | Biliris et al. ............. | 395/670 |
| 5,625,818 A | * | 4/1997 | Zarmer et al. ........... | 395/615 |
| 5,682,524 A | | 10/1997 | Freund et al. ............ | 395/605 |
| 5,684,984 A | * | 11/1997 | Jones et al. .............. | 395/610 |
| 5,694,598 A | * | 12/1997 | Durand et al. ........... | 395/614 |
| 5,752,027 A | | 5/1998 | Familiar .................. | 395/614 |
| 5,765,159 A | * | 6/1998 | Srinivasan ............... | 707/102 |
| 5,790,116 A | * | 8/1998 | Malone et al. ........... | 345/335 |
| 5,829,006 A | * | 10/1998 | Parvathaneny et al. .. | 707/101 |
| 5,832,498 A | * | 11/1998 | Exertier ................... | 707/103 |
| 5,850,544 A | * | 12/1998 | Parvathaneny et al. .. | 395/612 |
| 5,872,973 A | * | 2/1999 | Mitchell et al. .......... | 395/685 |
| 5,878,411 A | * | 3/1999 | Burroughs et al. ....... | 707/4 |
| 5,890,160 A | * | 3/1999 | Hembry .................. | 707/103 |
| 5,893,108 A | * | 4/1999 | Srinivasan et al. ...... | 707/103 |
| 5,897,634 A | * | 4/1999 | Attaluri et al. .......... | 707/8 |
| 5,937,409 A | * | 8/1999 | Wetherbee ............... | 707/103 |
| 5,956,730 A | * | 9/1999 | Burroughs et al. ...... | 707/104 |
| 5,960,438 A | * | 9/1999 | Chang et al. ............ | 707/103 |
| 6,003,083 A | * | 12/1999 | Davies et al. ........... | 709/226 |
| 6,032,144 A | * | 2/2000 | Srivastava et al. ...... | 707/2 |
| 6,047,284 A | * | 4/2000 | Owens et al. ........... | 704/4 |
| 6,061,515 A | * | 5/2000 | Chang et al. ............ | 395/702 |
| 6,076,090 A | * | 6/2000 | Burroughs et al. ...... | 707/102 |
| 6,101,502 A | * | 8/2000 | Heubner et al. ......... | 707/103 |
| 6,122,627 A | * | 9/2000 | Carey et al. ............. | 707/4 |
| 6,134,540 A | * | 10/2000 | Carey et al. ............. | 707/2 |
| 6,272,501 B1 | * | 8/2001 | Baumann ................. | 707/1 |

OTHER PUBLICATIONS

Thomas J. Mowbray and Ron Zahavi, "The Essential Corba, Systems Integration Using Distributed Objects", Copyright 1995, pp. 35–53.

DB2 Universal Database SQL Reference, vol. 5, S1OJ–8165–00, pp. 143–156, Copyright 1993, 1997.

David A. Taylor, Object–oriented Information Systems, 1992, John Wiley & Sons, Inc., p. 172–213.*

* cited by examiner

*Primary Examiner*—John Breene
*Assistant Examiner*—Linh Pham
(74) *Attorney, Agent, or Firm*—Gates & Cooper LLP

(57) ABSTRACT

A method, apparatus, and article of manufacture for defining object classes to match corresponding specialized data types stored in a relational database. An object-oriented application program may create an instance of a class for the purpose of representing data in a relational table that comprise a specialized data type. The attributes and behavior of the specialized data type in the database are preserved, where appropriate, in the corresponding class, and are available to the application program.

39 Claims, 3 Drawing Sheets

DEFINING OBJECT CLASSES TO MATCH CORRESPONDING SPECIALIZED DATA TYPES IN A RELATIONAL DATABASE

BACKGROUND OF THE INVENTION

1. Field of the Invention

The present invention relates generally to computerized methods for accessing databases, and in particular, to a method for defining object classes to match corresponding specialized data types stored in a relational database.

2. Description of Related Art

It is well known in the art to use database management systems, such as IBM's DB2™ relational database management system (RDBMS), to manage computerized databases. Currently, there is a need to access such databases using object-oriented application programs.

Object-oriented programming has become increasingly popular among software developers, because it offers the benefits of increased application program portability, interoperability, and interchangeability. Object-oriented programming techniques also reduce development risk and software development costs, and can extend the life cycle of the final product to prevent premature obsolescence.

An industry-consensus standard interface definition for interoperable object-oriented software, known as the Common Object Request Broker Architecture (CORBA), has been defined. CORBA simplifies the development and deployment of distributed systems software in several ways. First, CORBA defines a distributed environment using an object-oriented paradigm that hides differences between programming languages, operating systems, and object locations. Second, CORBA's object-oriented approach allows diverse types of implementations to inter-operate at the same level, hiding idiosyncrasies, and supporting reuse.

A central component of CORBA is an Object Request Broker (ORB), which functions as a communications infrastructure, transparently transceiving object requests across distributed heterogeneous computing environments. This is accomplished through a well-defined interface called the Interface Definition Language (IDL). Further details regarding CORBA and IDL are set forth in "The Essential CORBA, Systems Integration Using Distributed Objects," by Thomas V. Mobray and Ron Zahavi, 1995, which publication is incorporated by reference herein.

Class libraries are available to support object-oriented programming environments such as CORBA. These class libraries allow users to generate application programs using previously-defined classes.

Some existing class libraries include classes for manipulating specialized data types such as date, decimal, duration, time, and timestamp data types. However, these class libraries do not specifically match the semantics of specialized data types retrieved from relational databases. The semantics of these specialized data types are available only through calls to a relational database management system. Thus, object-oriented application programs cannot access and manipulate specialized type data values from relational databases according to the object-oriented programming paradigm.

Therefore, there is a need in the art for technologies that access existing relational databases using object-oriented techniques. Moreover, such technologies should minimize the need for developing new application programs.

SUMMARY OF THE INVENTION

To overcome the limitations in the prior art described above, and to overcome other limitations that will become apparent upon reading and understanding the present specification, the present invention discloses a method, apparatus, and article of manufacture for defining object classes to match corresponding specialized data types stored in a relational database. An object-oriented application program may create an instance of a class for the purpose of representing data in a relational table that comprise a specialized data type. The attributes and behavior of the specialized data type in the database are preserved, where appropriate, in the corresponding class, and are available to the application program.

Various advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown byway of illustration a specific embodiment in which the invention may be practiced. It is to be understood that other embodiments may be utilized and structural changes may be made without departing from the scope of the present invention.

Overview

The present invention provides a method for accessing a relational database using object-oriented techniques by modeling specialized data types within the database using specific object classes. The present invention allows an object-oriented application program to create an instance of a class for the purpose of representing data in a relational table that comprise a specialized data type. The attributes and behavior of the specialized data type in the database are preserved, where appropriate, in the corresponding class, and are available to the application program.

Hardware Environment

Figure 1:
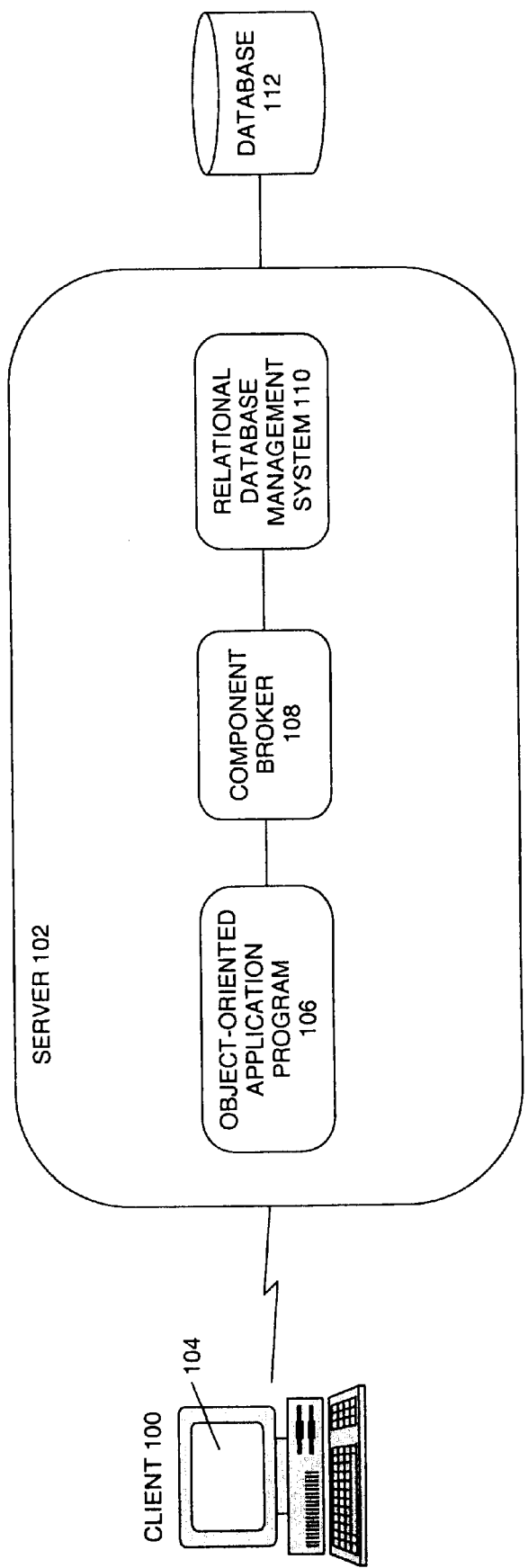
FIG. 1 is a block diagram illustrating an exemplary hardware environment used to implement the preferred embodiment of the present invention.

FIG. 1 is a block diagram illustrating an exemplary hardware environment used to implement the preferred embodiment of the invention. A client computer 100 communicates with a server computer 102. Both the client computer 100 and the server computer 102 are typically comprised of one or more processors, random access memory (RAM), read-only memory (ROM), and other components such data storage devices and data communications devices.

The client computer 100 executes one or more computer programs 104 operating under the control of an operating system. These computer programs 104 transmit requests to the server computer 102 for performing various functions and receive data from the server computer 102 in response to the requests.

The server computer 102 also operates under the control of an operating system, and executes one or more computer programs 106, 108, and 110. These computer programs 106, 108, and 110 receive requests from the client computer 100 for performing various functions and transmit data to the client computers 100 in response to the requests.

The server computer 102 manages one or more databases 112 stored on one or more data storage devices (such as a fixed or hard disk drive, a floppy disk drive, a CD-ROM drive, a tape drive, or other device). In a preferred embodiment, the database 112 is managed by the DB2™ relational database management system (RDBMS) offered by IBM Corporation. Those skilled in the art will recognize, however, that the present invention may be applied to any database and associated database management system.

The preferred embodiment of the present invention is generally implemented using five major components executed by client computers 100 and server computers 102, including a Client Program 104, Application Program 106, Component Broker 108 (which comprises a variant of an Object Request Broker), relational database management system (RDBMS) 110, and database 112, wherein each of these components comprise instructions and/or data. In the preferred embodiment, the Client Program 104 provides a user interface, the Application Program 106 performs application functions, the Component Broker 108 materializes data retrieved from the database 112 as objects, and the database management system 110 controls access to the database 112.

Generally, these instructions and/or data 104–112 are all tangibly embodied in or retrievable from a computer-readable device, medium, or carrier, e.g., a memory, a data storage device, a remote device coupled to the computer via a data communications device, etc. Moreover, these instructions and/or data, when read, executed, and/or interpreted by the client computer 100 and/or server computer 102, causes the client computer 100 and/or server computer 102 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data embodied in any device, medium, or carrier.

Of course, those skilled in the art will recognize many modifications may be made to this configuration without departing from the scope of the present invention. Those skilled in the art will also recognize that any combination of the above components, or any number of different components, including computer programs, peripherals, and other devices, may be used to implement the present invention, so long as similar functions are performed thereby.

Component Broker

Figure 2:
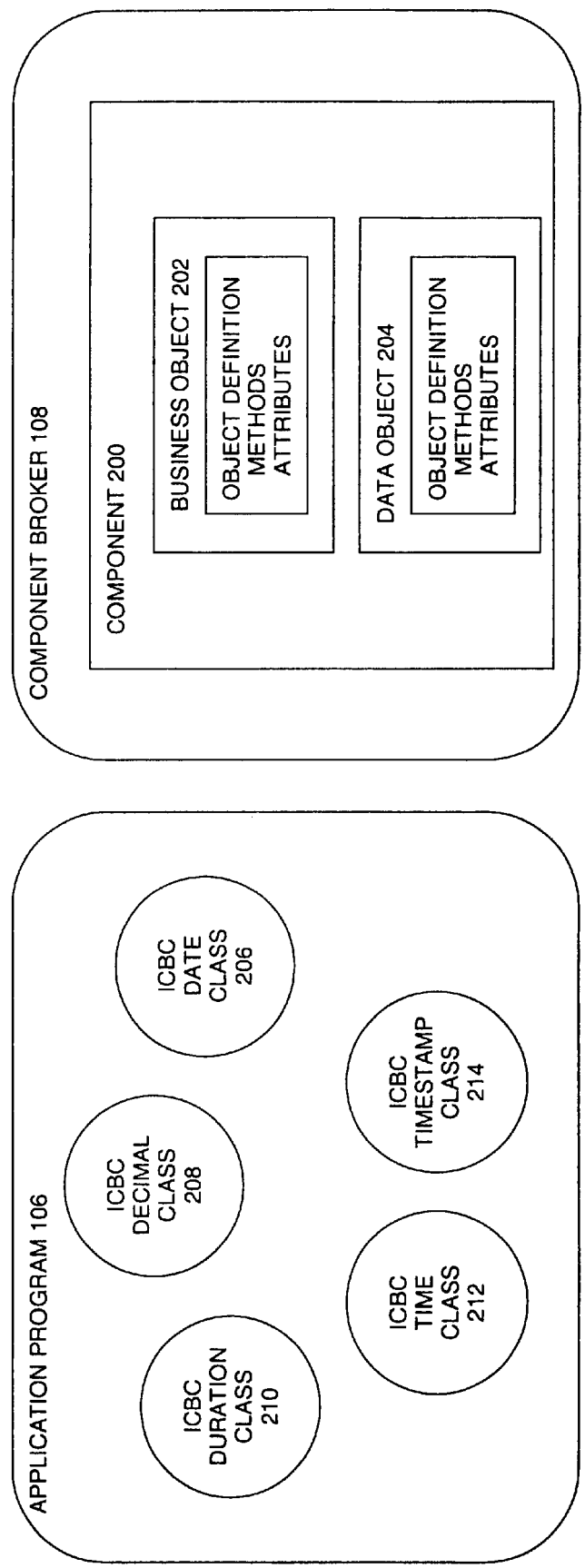
FIG. 2 is a block diagram that further illustrates the structure of a Component Broker according to the present invention.

FIG. 2 is a block diagram that further illustrates the structure of the Component Broker 112 according to the present invention. The Component Broker 112 provides a suite of tools that allows the user to write computer programs in an object-oriented programming context. In the preferred embodiment, the Component Broker 112 interacts with the Application Program 106. In alternative embodiments, the Component Broker 112 could interact with the Client Program 104 as well.

The Component Broker 112 is used to create and work with components 200, wherein a component 200 is a distributed set of objects that an Application Program 106 can access as a single entity and which work together to represent the logic and data relationships that perform a desired function for the Application Program 106.

In the present invention, the component 200 generally comprises a business object 202 and a data object 204, although other elements may be present as well. Business objects 202 include one or more methods and one or more attributes that are used directly by the Application Program 106. Data objects 204 also include one or more methods and one or more attributes that are used directly by the business objects 202 (and this indirectly by the Application Program 106).

Business objects 202 and data objects 204 are independent of any individual Application Program 106 and can be used in any combination to perform a desired task. A business object 202 may also have relationships with other business objects 202 and can cooperate with these other business objects 202 to perform a desired task.

Data objects 204 have direct access to data stored in the relational database 112 and are responsible for managing the persistence of state data for the component 200. By providing an interface between business objects 202 and the RDBMS 110, the data object 204 isolates the business object 202 from the details of the RDBMS 110 and relieves it from having to keep track of how to access and manage the data while maintaining persistency.

An Application Program 106 may access the data stored in the relational database 112 by interacting with business objects 202, which in turn interact with data objects 204, which in turn transmit requests to the RDBMS 110 using SQL functionality. For example, the data object 204 will generally have member functions that generate the appropriate SQL statements, package the statements, and forward them to the RDBMS 110 for execution, receive and process the results, and then return the results to the business objects 202, which ultimately provides access to the results to the Application Program 106.

As is well known, each column of a relational table 112 has a respective data type. Traditional data types include integer, floating point, logical, fixed length character, and variable length character data types. Some specialized data types include date, decimal, duration, time, and timestamp. Generally, SQL statements include expressions or functions that permit manipulation of the specialized data types. A description of specialized data types and their associated expressions or functions can be found in the publication by IBM Corporation entitled *DB2 Universal Database SQL Reference V.5*, S1OJ-8165-00, pp. 143–156, Copyright 1993, 1997.

The direct use of such SQL expressions or functions is disadvantageous in that the specialized data type must be retrieved from the table in the relational database 112, the function must be performed by the RDBMS 110, and the result must then be provided back to the data object 204. There would be advantages, then, to performing these functions for specialized data types in an object, rather than the RDBMS 110. However, prior art class libraries do not support specialized data types.

In the present invention, the Component Broker 108 provides helper classes 206, 208, 210, 212, and 214 that emulate the semantics of the corresponding specialized data types for use in various operations, such as comparison operations, arithmetic operations, etc. In the preferred embodiment, these classes 206, 208, 210, 212, and 214 include:

- ICBCDate Class 206 (representing the Date type).
- ICBCDecimal Class 208 (representing the Decimal type).
- ICBCDuration Class 210 (representing the Date Duration, Time Duration, Timestamp duration, and Labeled Duration types). The Duration data type is complementary to the Date, Time, and Timestamp classes, but is not, itself, stored in tables in the relational database 112.
- ICBCTime Class 212 (representing the Time type).
- ICBCTimestamp Class 214 (representing the Timestamp type).

(The abbreviation ICBC stands for IBM Component Broker Class.)

Each helper class 206, 208, 210, 212, and 214 provides a public interface (i.e., IDL) for accessing the attributes and for invoking the methods or member functions of the class. In each case, the public interface of the class is designed to match the characteristics and usage of the particular specialized data type in the RDBMS 110. As a result, methods or member functions performed by these classes 206, 208, 210, 212, and 214 produce the same results as equivalent SQL expressions evaluated by the RDBMS 110. Thus, the Application Program 106 uses the helper class objects 206, 208, 210, 212, and 214 to manipulate Dates, Decimals, Durations, Times, or Timestamps whenever it is desirable that the results should be consistent with those that would be produced by the RDBMS 110 itself.

In the preferred embodiment, the helper classes 206, 208, 210, 212, and 214 are implemented in accordance with specialized data types and associated expressions or functions found in the DB2™ RDBMS 110 sold by IBM Corporation. However, those skilled in the art will recognize that the classes 206, 208, 210, 212, and 214 can be implemented to accommodate specialized data types from any RDBMS 110, such as those offered by ORACLED™, SYBASE™, MICROSOFT™, etc.

Descriptions of the helper classes 206, 208, 210, 212, and 214, and a list of at least some of their methods or member functions are provided below. In addition, the Programming Language Reference included below provides additional descriptions of the various attributes and methods associated with the helper classes 206, 208, 210, 212, and 214.

ICBC Date Class

The ICBCDate Class 206 stores the value of a calendar date between 01/01/0001 and 12/31/9999. AR access and manipulation of this date is through a public functional interface. The actual date value and its format are stored in private attributes.

Note that ICBCDate Class 206 assumes the proleptic Gregorian calendar. The Gregorian calendar in use today is assumed to extend back to year 0001 and it is the responsibility of the application to apply any corrections that may be required for dates prior to the Gregorian calendar reform.

The ICBCDate Class 206 includes a number of different methods such as object initialization, comparisons, query functions, and manipulation functions. The object initialization methods include initializeFromString, initializeFromNumber, itializeFromTimestamp, and initalizeFromValues methods. The comparison methods include equalTo, notEqualTo, lessThan, lessThanOrEqualTo, greaterThan, and greaterThanOrEqualTo. The query functions methods include OutputFormat, formattedString, day, dayOfWeek, dayOfYear, julianDay, modifiedJulianDay, dayName, dayFromString, dayOfWeekFromString, dayOfYearFromString, julianDayFromString, modifiedJulianDayFromString, dayNameFromString, dayNameFromNumber, month, monthName, monthFromString, monthNameFromString, monthNameFromNumber, quarter, quarterFromstring, year, yearFromString, isLeapYear, daysInObject, daysInString, daysInMonth, daysInYear, isVaidMonthDayYear, isValidYearDay, and isObjectChanged. The manipulation methods include assignFromDate, increment, decrement, dateOverflow, intervalFromDate, intervalFromString, and intravalFromLong.

ICBCDecimal Class

The ICBCDecimal Class 208 stores the value of a Decimal data type (from a DB2™ RDBMS 110) or number type (from an ORACLE™ RDBMS 110) in which scale is less than or equal to precision, and positive with a specified maximum precision (e.g., 38). All access and manipulation of this value is through a public functional interface. The actual decimal value and its precision and scale are stored in private attributes.

The ICBCDecimal Class 208 includes a number of different methods such as object initialization, comparisons, query functions, and manipulation functions. The object initialization methods include initializeFromString1, initializeFromString2, initializeFromDouble, initializeFromFloat, initializeFromLong, initializeFromShort, initializdFormDecimal1, initializeFromDecimal2, and initiaizeFromPackedDecimal. The comparison methods include equalTo, notEqualTo, lessThan, lessThanOrEqualTo, greaterThan, and greaterThanOrEqualTo. The query functions methods include getAsFormattedString1, getAsFormattedString2, getAsFormattedString3, getAsDouble, getAsFloat, getAsLong, getAsShort, getAsDigits, getAsPackedDecimal, getPrecision, getScale, isNegative, and isChanged. The manipulation methods include assignFromDecimal, assignFromDouble, assignFromFloat, assignFromLong, assignFromShort, increment, decrement, multiplyThisObjectBy, divideThisObjectBy, remainderInThisObject, addWithNewObject, subtractWithNewObject, multiplyWithNewObject, divideWithNewObject, remainderWithNewObject, getPrecedingRemainder, swapSign, and decimalOverflow.

ICBCDuration Class

The ICBCDuration Class 210 represents the "Labeled Duration", "Date Duration", "Time Duration", and "Timestamp Duration" constructs of Duration. Duration is complementary data type to Date, Time, and Timestamp, and participates in expressions in SQL statements. However, it is not, itself, stored in tables in the relation database 112.

The Class 210 holds the value of a duration, and a record of whether this duration value is in units of years, months, days, hours, minutes seconds, or microseconds. The value can also be of a composite type defining a "Date Duration" of the form yyyymmdd, a "Time Duration" of the form hhmmss, or a "Timestamp Duration" of the form yyyym-mddhhmmsszzzzz..

In the preferred embodiment, arithmetic between two ICBCDuration Class 210 objects is not supported (which is consistent with DB2™ support of Durations). However, they can be compared, and a unary minus operator (which swaps the sign) is provided.

The ICBCDuration Class 210 includes a number of different methods such as object initialization, comparisons, query functions, and manipulation functions. The object initialization methods include initializeLabeledDuration, initializeDateTimeDuration, and initializeTimestampDuration. The comparison methods include equalTo, notEqualTo, lessThan, lessThanOrEqualTo, greaterThan, and greaterThanOrEqualTo. The query functions methods include isNegative, microsecond, second, minute, hour, day, month, year, size, and formattedString. The manipulation function methods include assignFromDuration, and swapSign.

ICBCTime Class

The ICBTime Class 212 stores the value of a time-of-day. All access and manipulation of this time is through a public functional interface. The actual time value and its format are stored in private attributes.

The ICBCTime Class 212 includes a number of different methods such as object initialization, comparisons, query functions, and manipulation functions. The object initialization methods include initializeFromString, initiailzeFromTimestamp, and initializeFromValues. The comparison methods include equalTo, notEqualTo, lessThan, lessThanOrEqualTo, greaterThan, and greaterThanOrEqualTo. The query functions methods include second, minute, hour, and isObjectChanged. The manipulation functions methods include assignFromTime, increment, decrement, timeOverflow, intervalFromTime, and intervalFromString.

ICBCTimestamp Class

The ICBCTimestamp Class 214 stores the value of a Timestamp type (from a DB2™ RDBMS 110) or a DATE type (from an ORACLE™ RDBMS 110). All access and manipulation of this timestamp is through a public functional interface; the actual timestamp value is stored in private attributes.

In the preferred embodiment, a Timestamp attribute in a business object 204 that originates from the database 112 is represented by Component Broker 108 as a 26 character string of form yyyy-mm-dd-hh.mm.ss.mmmmmm. This string can be used to initialize an instance of the ICBCTimestamp Class 214 through the initializeFromString function. A DATE attribute that originates from an ORACLE™ database 112 is represented by Component Broker 108 in the same 26 character form yyyy-mm-dd-hh.mm.ss.mmmmmm; but with the final six characters (the microseconds field) always set to zeros. This string can be used to initialize an instance of the ICBCTimestamp Class 214 via initializeFromString function. However, ORACLES™ dates earlier than 0001-01-01 are rejected. Whether the ICBCTimestamp object is initialized from data originating in a DB2™ or in ORACLE™ database 112, ICBCTimestamp applies DB2™ semantics in its processing of the data.

The ICBCTimestamp Class 214 includes a number of different methods such as object initialization, comparisons, query functions, and manipulation functions. The object initialization methods include initializeFromString, initializeFromDateTime, initializeFromDate, initializeFromTime, and initiaizeFromDataStoreFormat. The comparison methods include equalTo, notEqualTo, lessThan, lessThanOrEqualTo, greaterThan, and greaterThanOrEqualTo. The query functions methods include formattedString, getAsDateFormattedString, getAsTimeFormattedString, getAsDatstoreFormat, microsecond, second, minute, hour, day, month, year, dayOfWeek, dayOfYear, julianDay, modifiedJulianDay, dayName, dayFromString, dayOfWeekFromString, dayOfYearFromString, julianDayFromString, modifiedJulianDayFromString, dayNameFromString, dayNameFromNumber, monthName, monthFromString, monthNameFromString, monthNameFromNumber, quarter, quarterFromString, yearFromString, isLeapYear, daysInObject, daysInString, daysInMonth, daysInYear, and isObjectChanged. The manipulation functions methods include assignFromTimestamp, increment, decrement, timestampOverflow, intervalFromTimestamp, and intervalFromString.

Logic of the Invention

Figure 3:
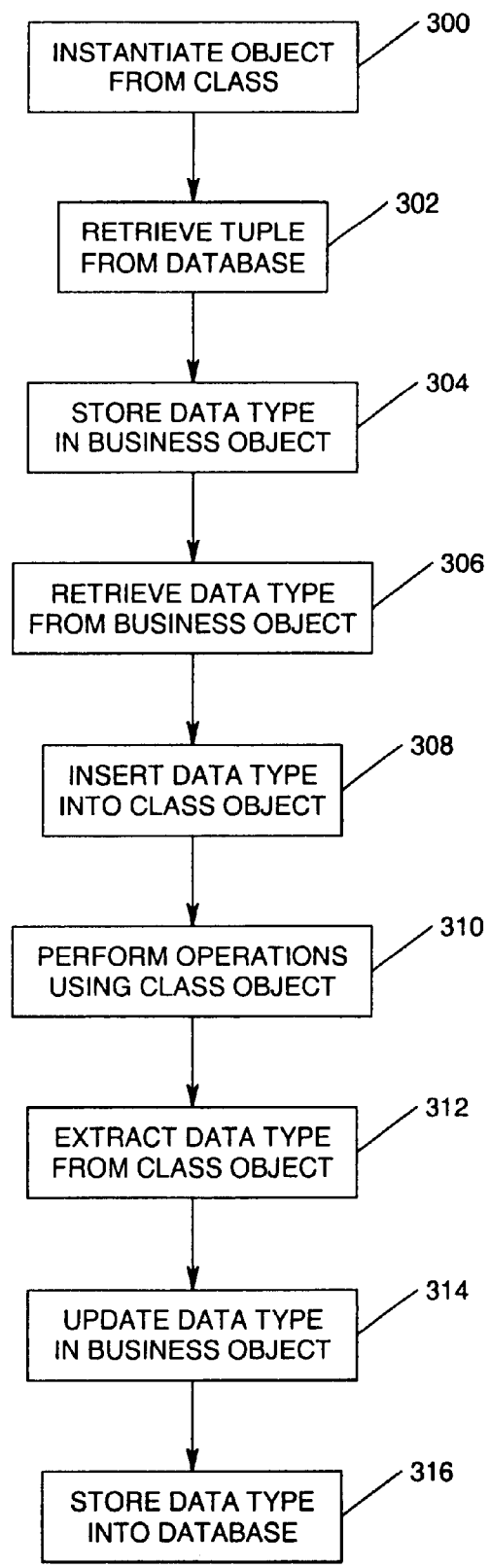
FIG. 3 is a flowchart illustrating the logic performed by an Application Program, Component Broker, and Relational Database Management System according to the preferred embodiment of the present invention.

FIG. 3 is a flowchart illustrating the logic performed by the Application Program 106, Component Broker 108, and RDBMS 110 according to the preferred embodiment of the present invention.

Block 300 represents the Component Broker 108 instantiating one or more of the helper classes 206, 208, 210, 212, and 214 as objects. Generally, this step is performed in response to a request from the Application Program 106, although other events may trigger this step as well.

Block 302 represents the Component Broker 108 retrieving one or more tuples comprised of at least a Date, Decimal, Duration, Time, or Timestamp column or attribute from a table in the relational database 112. This retrieval step is performed via the data object 204 within the Component Broker 108, wherein the data object 204 has member functions that generate appropriate SQL statements, package the statements, and forward them to the RDBMS 110 for execution.

Block 304 represents the Component Broker 108 storing the requested data retrieved from the table in the relational database 112 as a string attribute in a business object 202. This storage step is also performed via the data object 204 within the Component Broker 108, wherein the data object 204 has member functions that receive and process the results from the execution of the SQL statements by the RDBMS 110, and then return the results to the business objects 202.

Block 306 represents the Application Program 106 retrieving the string attribute from the business object 202 in the Component Broker 108.

Block 308 represents the Application Program 106 using the retrieved string attribute to initialize one or more of the helper class objects 206, 208, 210, 212, or 214 in the Component Broker 108.

Block 310 represents the Application Program 106 performing one or more various operations, such as object initialization, comparisons, query functions, manipulation functions, arithmetic operations, etc., on the helper class objects 206, 208, 210, 212, or 214.

Block 312 represents the Application Program 106 extracting the string attribute from the helper class objects 206, 208, 210, 212, or 214 in the Component Broker 108.

Block 314 represents the Application Program 106 updating the attribute in the business object 202 using the extracted string attribute.

Block 316 represents the Component Broker 108 storing the updated string attribute from the business object 202 into the relational database 112. This storing step is performed via the data object 204 within the Component Broker 108, wherein the data object 204 has member functions that generate appropriate SQL statements, package the statements, and forward them to the RDBMS 110 for execution.

Conclusion

This concludes the description of the preferred embodiment of the invention. The following paragraphs describe some alternative methods of accomplishing the same objects.

In alternative embodiments of the present invention, other types and configurations of computers could be used. For example, the invention need not be restricted to client-server configurations. In addition, mainframes, minicomputers, or personal computers, could be used with the present invention.

In alternative embodiments of the present invention, other types and configurations of computer programs could be used. For example, the invention need not be restricted to COBRA environments, but could be used with COM, DCOM, or other object-oriented environments.

In alternative embodiments of the present invention, other database management systems could be used. For example, the invention need not be restricted to DB2™ relational database in management systems. Instead, the present invention could be used to model other types of databases and datastores.

In summary, the present invention discloses a method, apparatus, and article of manufacture for defining object classes to match corresponding specialized data types stored in a relational database. An object-oriented application program may create an instance of a class for the purpose of representing data in a relational table that comprise a specialized data type. The attributes and behavior of the specialized data type in the database are preserved, where appropriate, in the corresponding class, and are available to the application program.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

Programming Language Reference

The following Programming Language Reference provides descriptions of the various attributes and methods associated with the helper classes 206, 208, 210, 212, and 214. These descriptions describe the implementation of the preferred embodiment of the present invention, and are not intended to be limiting in any way. Specifically, those skilled in the art will recognize that different methods, attributes, functionality or implementations may be made without departing from the scope of the present invention.

ICBCDate Class

The class stores the value of a calendar date between 01/01/0001 and 12/31/9999. All access and manipulation of this date is through a public functional interface. The actual date value and its format are stored in private attributes.

Note that ICBCDate assumes the proleptic Gregorian calendar. The Gregorian calendar in use today is assumed to extend back to year 0001 and it is the responsibility of the application to apply any corrections that may be required for dates prior to the Gregorian calendar reform.

IDL Interface Description

```
interface ICBCDate: IManagedLocal::ILocalOnly
{
// Object initialization
boolean initializeFromString(in string aDate);
boolean initializeFromNumber(in long aDate);
boolean initializeFromTimestamp(in ICBCTimestamp
    aTimestamp);
boolean initializeFromValues(in long aYear, in long aMonth,
    in long aDay);
// Comparisons
boolean equalTo(in ICBCDate aDate);
boolean notEqualTo(in ICBCDate aDate);
boolean lessThan(in ICBCDate aDate);
boolean lessThanOrEqualTo(in ICBCDate aDate);
boolean greaterThan(in ICBCDate aDate);
boolean greaterThanOrEqualTo(in ICBCDate aDate);
// Query functions
in enum OutputFormat {ISO, USA, EUR, JIS, LOC)};
string formattedString(inout string aTarget,
    in ICBCDate::OutputFormat aFormat);
long day( );
long dayOfWeek( );
long dayOfYear( );
long julianDay( );
long modifiedJulianDay( );
string dayName( );
long dayFromString(in string aString);
long dayOfWeekFromString(in string aDate);
long dayOfYearFromString(in string aDate);
long julianDayFromString(in string aDate);
long modifiedJulianDayFromString(in string aDate);
string dayNameFromString(in string aDate);
string dayNameFromNumber(in long aDayIndex);
long month( );
string monthName( );
long monthFromString(in string aDate);
string monthNameFromString(in string aDate)
string monthNameFromNumber(in long aMonthIndex);
long quarter( );
long quarterFromstring(in string aDate);
long year( );
long yearFromString(in string aString);
boolean isLeapYear(in long aYear);
long daysInObject( );
long daysInString(in string aDate);
long daysInMonth(in long aYear, in long aMonth);
long daysInYear(in long aYear);
boolean isValidMonthDayYear(in long aMonth, in long
    aDay,
    in long aYear);
boolean isValidYearDay(in long aYear, in long aDay);
boolean isObjectChanged( );
// Manipulation functions
void assignFromDate(in ICBCDate aDate);
void increment(in ICBCDuration aDuration);
void decrement(in ICBCDuration aDuration);
long dateOverflow( );
ICBCDuration intervalFromDate(in ICBCDate aDate);
ICBCDuration intervalFromString(in string aDate);
ICBCDuration intervalFromLong(in long aDate);
};
```

Supported Methods
ICBCDate::_create

ICBCDate::assignFromDate
ICBCDate::dateOverflow
ICBCDate::day
ICBCDate::dayFromString
ICBCDate::dayName
ICBCDate::dayNameFromNumber
ICBCDate::dayNameFromString
ICBCDate::dayOfWeek
ICBCDate::dayOfWeekFromString
ICBCDate::dayOfYear
ICBCDate::dayOfYearFromString
ICBCDate::daysInMonth
ICBCDate::daysInObject
ICBCDate::daysInString
ICBCDate::daysInYear
ICBCDate::decrement
ICBCDate::equalTo
ICBCDate::formattedString
ICBCDate::greaterThan
ICBCDate::greaterThanOrEqualTo
ICBCDate::increment
ICBCDate::initializeFromNumber
ICBCDate::initializeFromString
ICBCDate::initializeFromTimestamp
ICBCDate::initializeFromValues
ICBCDate::interval
ICBCDate::isObjectChanged
ICBCDate::isLeapYear
ICBCDate::isValidMonthDayYear
ICBCDate::isValidYearDay
ICBCDate::julianDay
ICBCDate::julianDayFromString
ICBCDate::lessThan
ICBCDate::lessThanOrEqualTo
ICBCDate::modifiedJulianDay
ICBCDate::modifiedJulianDayFromString
ICBCDate::month
ICBCDate::monthFromString
ICBCDate::monthName
ICBCDate::monthNameFromNumber
ICBCDate::monthNameFromString
ICBCDate::notEqualTo
ICBCDate::quarter
ICBCDate::quarterFromString
ICBCDate::year
ICBCDate:yearFromString
ICBCDate::_create Returns a pointer to a new IDBCDate object. The object is initialized to the current system date.

ICBCDate::assignFromDate

Sets all state data in this ICBCData object equal to the second ICBCData object. The change flag of this object is set to TRUE.

IDL Syntax
  ICBCDate assignFromDate (in ICBCDate aDate);
ICBCDate::dateOverflow Returns the number of overflow or underflow years of a preceding increment or decrement operation. For an increment, returns the years in excess of year 9999; for decrement, the number of years less than year 0001.

IDL Syntax
  long dateOverflow( );
ICBCDate::day

Returns the day part of this object, as a number between 1 and 31.

IDL Syntax
  long day( );

ICBCDate::dayFromString

Returns the day part Returns the day part of the date encoded in the input string parameter.

The input string parameter must conform to a format recognizable as a date. Refer to IBCDate::initializeFromString( ) for a description of supported formats. If the input parameter is not recognizable, a value of −1 is returned.

IDL Syntax
  long dayFromString(in string aString);
ICBCDate::dayName

Returns a string containing the name of the day of the week for this date object.

IDL Syntax
  string dayName( );
ICBCDate::dayNameFromNumber

Returns a string containing the name of the day of the week for the day number within a week provided in the input parameter. The input parameter must be a number between 1 and 7. Sunday is day number 1.

If the input parameter is not recognizable, an empty string is returned.

IDL Syntax
string dayNameFromNumber(in long aDayIndex);
ICBCDate::dayNameFromString Returns a string containing the name of the day of the week for the date encoded in the input string parameter. The input string parameter must conform to a format recognizable as a date. Refer to ICBCDate::initializeFromString for a description of supported formats.

If the input parameter is not recognizable, an empty string is returned.

IDL Syntax
long dayNameFromString(in string aDate);
ICBCDate::dayOfWeek

Returns a number between 1 and 7 representing the day of the week for this date object. Sunday is day number 1.

IDL Syntax
long dayOfWeek( );
ICBCDate::dayOfWeekFromString

Returns a number between 1 and 7 representing the day of the week for the date encoded in the input string parameter. Sunday is day number 1.

The input string parameter must conform to a format recognizable as a date. Refer to ICBCDate::initializeFromString for a description of supported formats. If the input parameter is not recognizable, a value of −1 is returned.

IDL Syntax
long dayOfWeekFromString(in string aString);
ICBCDate::dayOfYear

Returns a number between 1 and 366 representing the day of the year for this date object. January 1 is day number 1.

IDL Syntax
long dayOfYear( );
ICBCDate::dayOfYearFromString

Returns a number between 1 and 366 representing the day of the year for the date encoded in the input string parameter. January 1 is day number 1.

The input string parameter must conform to a format recognizable as a date. Refer to ICBCDate::initializeFrom-String for a description of supported formats. If the input parameter is not recognizable, a value of −1 is returned.

IDL Syntax
long dayOfYearFromString(in string aString);
ICBCDate::daysInMonth

Returns the number of days in the month of the year provided in the input parameters. Month number must be between 1 and 12.

If the input parameters are not valid, a value of −1 is returned.
IDL Syntax
long daysInMonth(in long aYear, in long aMonth);
ICBCDate::daysInObject
Returns the number of days from January 1, 0001 to the date represented by this object, plus one day. For example, an object holding the date January 2, 0001 returns the value 2.
IDL Syntax
long daysInObject( );
ICBCDate::daysInString
Returns the number of days from January 1, 0001 to the date represented by the string parameter, plus one day. For example, an object holding the date 00010102 returns the value 2. If the string is invalid, the value −1 is returned.
IDL Syntax
long daysInString(in string aDate);
Parameters
  The string must be one of the following:
  A string of length 7 of the form yyyynnn.
  A string of length 6 of the form yyyymmdd.
  A punctuated string representation of a date.
aDate
  For additional details on the string parameter, see ICBCDate::initializeFromString.
ICBCDate::daysInYear
Returns the number of days in the year provided in the input parameter.
If the input parameter is not valid, a value of −1 is returned.
IDL Syntax
long daysInYear(in long aYear);
ICBCDate::decrement
Subtracts a ICBCDuration from the value of this ICBCDate object.
IDL Syntax
void decrement(in ICBCDuration aDuration);
Remarks
This operation is performed essentially as the inverse of ICBCDate::increment. When the duration of type DATE is subtracted from a date, the date is decremented by the specified number of days, months, and years (in this order). If the years value of the result of an decrement operation is less than 0001 years, the years value of the result is set to 0001 and the number of underflow years can be retrieved as a negative number using ICBCDate::dateOverflow. The number of overflow years is cleared by the next assignFromDate or arithmetic operation on the object.
The change flag of this object is set to TRUE.
ICBCDate::equalTo
Returns TRUE if the date in this ICBCDate object is equal to the other ICBCDate object.
IDL Syntax
boolean equalTo(in ICBCDate aDate);
ICBCDate::formattedString
Returns the date value of this object as a string in a specified format. The parameter OutputType must take one of the values: ISO, USA, EUR, JIS. Formats are as described for ICBCDate::initializeFromString. The LOC site-defined operation described in the DB2 manual is not supported by ICBCDate.
The application must supply a non-const pointer to a target storage area long enough to receive the formatted date. The function returns a reference to this area.
IDL Syntax
string formattedString(inout string aOutput,
   in ICBCDate::OutputFormat aFormat)

ICBCDate::greaterThan
Returns TRUE if the date stored in this ICBCDate object is greater than the other ICBCDate object.
IDL Syntax
boolean greaterThan(in ICBCDate aDate);
ICBCDate::greaterThanOrEqualTo
Returns TRUE if the date stored in this ICBCDate object is greater than or equal to the other ICBCDate object.
IDL Syntax
boolean greaterThanOrEqualTo(in ICBCDate aDate);
ICBCDate::increment
Adds a ICBCDuration to the value of this ICBCDate object. If the duration is negative, the operation is performed as a decrement. If a duration of type YEARS is added to the date, only the year portion of the date is affected. The month is unchanged, as is the day, unless the result would be February 29 of a non-leap-year. In this case, the day is changed to 28.
Similarly, if a duration of type MONTHS is added, only months and, if necessary, years are affected. Note that adding months to a Date is like turning the pages of a calendar, starting with the page on which the date appears. The day portion of the date is unchanged unless the result would be invalid (September 31, for example). In this case, the day is set to the last day of the month. If one or more months is added to a given date, and then the same number of months is subtracted from the result, the final date is not necessarily the same as the original date.
Adding a duration of type DAYS will, of course, affect the day portion of the date, and potentially the month and year.
When a duration of type DATE is added to a date, the date is incremented by the specified number of year, months, and days, in this order.
If the years value of the result of an increment operation is greater than 9999 years, then the years value of the result is set to 9999, and the number of overflow years can be retrieved using the dateOverflow( ) function. The number of overflow years is cleared by the next assignFromDate of arithmetic operation on the object.
The change flag of this object is set to TRUE.
IDL Syntax
void increment(in ICBCDuration aDuration);
ICBCDate::initializeFromNumber
Accepts a numerical value for the date. Any existing value in the object is replaced. The parameter aDate must be positive, non-zero, and less than 3652059. Creates a date that is (aDate−1) days beyond Jan. 1, 0001, i.e., Jan. 2, 0001 is day number 2. Returns TRUE if the number is a valid date representation, FALSE otherwise. If FALSE is returned the state of the object is unchanged.
IDL Syntax
boolean initializeFromNumber(in long aDate);
ICBCDate::initializeFromString
Accepts a value for the date in the form of a string. Returns TRUE if the string is a valid date representation and the object is successfully initialized. Any existing value in the object is replaced. Returns FALSE if the parameter is invalid. If FALSE is returned the state of the object is unchanged.
IDL Syntax
boolean initializeFromString(in string aDate);
Parameters
  The string must be:
  A string of length 7 of the form yyyynnn. The yyyyddd string must consist of entirely numeric characters with padding zeros where necessary—embedded signs or blanks are not allowed. However leading and trailing blanks are acceptable provided the string length is less than 20 characters. Only SBCS characters maybe present in the string.

A string of length 8 of the form yyyymmdd. The yyyymmdd string must consist of entirely numeric characters with padding zeros where necessary—embedded signs or blanks are not allowed. However leading and trailing blanks around the string are acceptable provided the string length is less than 20 characters. Only SBCS characters may be present in the string.

A valid punctuated string representation of a date, in one of the following valid forms:

aDate

International Standards Organization (ISO) (yyyy-mm-dd).

IBM USA standard (USA) (mm/dd/yyyy).

IBM European standard (EUR) (dd.mm.yyyy)

Japanese Industrial Standard Christian Era (JIS) (yyyy-mm-dd).

Leading and trailing blanks are acceptable provided the string length is less than 20 characters. Leading zeros may be omitted from the month and day portions. Only SBCS characters may be present in the string.

A string representation of a timestamp. Any of the string forms acceptable by the ICBCTimestamp::initializeFromString function are acceptable. For details refer to that function. Briefly, the forms include:

A punctuated string: yyyy-mm-dd-hh.mm.ss.nnnnnn.

A 14 byte string without punctuation, of the form: yyyymmddhhmmss.

ICBCDate::initializeFromTimestamp

Initializes this object from the date portion of a Timestamp object.

IDL Syntax boolean initializeFromTimestamp(in ICBCTimestamp aTimestamp);

ICBCDate::initializeFromValues

Accepts the date in the form of three separate value parameters for year, month, and day. The values must make a valid date. Returns TRUE if the values are a valid date representation, FALSE otherwise. If FALSE is returned the state of the object is unchanged.

IDL Syntax boolean initializeFromValues(in long aYear, in long aMonth, in long aDay);

ICBCDate::interval

Calculates the Duration between two ICBCDate objects. The result is a pointer to a new ICBCDuration object of type DATE.

If the interval between DATE1 and DATE2 is required, and DATE1 is greater than or equal to DATE2, the operation is performed by subtracting DATE2 from DATE1. If, however, DATE1 is less than DATE2, DATE1 is subtracted from DATE2, and the sign of the result is made negative.

The following procedural description clarifies the steps involved in the operation result DATE1-DATE2.

If DAY(DATE2)<=DAY(DATE1)

then DAY(RESULT)=DAY(DATE1)-DAY(DATE2).

If DAY(DATE2)>DAY(DATE1)

then DAY(RESULT)=N+DAY(DATE1)-DAY(DATE2)

where N=the last day of MONTH(DATE2).

MONTH(DATE2) is then incremented by 1.

If MONTH(DATE2)<=MONTH(DATE1)

then MONTH(RESULT)=MONTH(DATE1)-MONTH(DATE2).

If MONTH(DATE2)>MONTH(DATE1)

then MONTH(RESULT)=12+MONTH(DATE1)-MONTH(DATE2).

YEAR(DATE2) is incremented by 1.

YEAR(RESULT)=YEAR(DATE1)-YEAR(DATE2).

IDL Syntax

ICBCDuration_ptr intervalFromDate(in ICBCDate aDate);

ICBCDuration_ptr intervalFromString(in string aDate);

ICBCDuration_ptr intervalFromLong(in long aDate);

In the cases with a string parameter, the parameter must be recognizable as a date. For details refer to the description of ICBCDate::initializeFromString. If the string is invalid, a pointer value of −1 is returned.

ICBCDate::isObjectChanged

Returns a boolean indicating whether the value of this object has been changed since it was initialized.

IDL Syntax boolean isObjectChanged( );

ICBCDate::isLeapYear

Returns TRUE if the year number in the input parameter is a leap year, FALSE otherwise. Year number must be between 1 and 9999.

If the input parameter is not in this range, FALSE is returned.

IDL Syntax boolean isLeapYear(in long aYear);

ICBCDate::isValidMonthDayYear

Returns TRUE if the provided values for month, day, and year make a valid date, and FALSE otherwise.

IDL Syntax boolean isValidMonthDayYear(in long aMonth, in longMonth, in longYear);

ICBCDate::isValidYearDay

Returns TRUE if the provided values for year, and day within year make a valid date, and FALSE otherwise.

IDL Syntax boolean isValidYearDay(in long aYear,in long aDay);

ICBCDate::julianDay

Returns the Julian day number corresponding to noon GMT on the date represented by this object. (Julian Day count started at noon, GMT, on January 1, 4712 BC IDL Syntax long julianDay( );

ICBCDate::julianDayFromString

Returns the Julian day number corresponding to noon GMT on the date encoded in the input string parameter. (Julian Day count started at noon, GMT, on January 1, 4712 BC). The input string parameter must conform to a format recognizable as a date. Refer to ICBCDate::initializeFromString for a description of supported formats. If the input parameter is not recognizable, a value of −1 is returned.

IDL Syntax long julianDayFromString(in string aString);

ICBCDate::lessThan

Returns TRUE if the date stored in this ICBCDate object is less than the other ICBCDate object.

IDL Syntax boolean lessThan(in ICBCDate aDate);

ICBCDate::lessThanOrEqualTo

Returns TRUE if the date stored in this ICBCDate object is less than or equal to the other ICBCDate object.

IDL Syntax boolean lessThanOrEqualTo(in ICBCDate aDate);

ICBCDate::modifiedJulianDay

Returns the Modified Julian day number (MJD) corresponding to time 00:00:00 GMT on the date represented by this object. MJD is defined as Julian Day—2,400,000.5 days. It thus starts at time 00:00:00 (i.e. midnight), in line with normal civil practice, and unlike Julian Day which extends from noon to noon.
IDL Syntax
long modified Julianay( );
ICBCDate::modifiedJulianDayFromString
Returns the Modified Julian day number (MJD) corresponding to time 00:00:00 GMT on the date encoded in the input string parameter. MJD is defined as Julian Day—2,400,000.5 days. It thus starts at time 00:00:00 (i.e., midnight), in line with normal civil practice, and unlike Julian Day which extends from noon to noon.

The input string parameter must conform to a format recognizable as a date. Refer to ICBCDate::initializeFromString for a description of supported formats. If the input parameter is not recognizable, a value of −1 is returned.
IDL Syntax
long modifiedJulianDayFromString(in string aString);
ICBCDate::month
Returns the month part of this object, as a number between 1 and 12.
IDL Syntax
long month( );
ICBCDate::monthFromString
Returns the month part of the date encoded in the input string parameter. The input string parameter must conform to a format recognizable as a date. Refer to ICBCDate::initializeFromString for a description of supported formats.

If the input parameter is not recognizable, a value of −1 is returned.
IDL Syntax
long monthFromString(in string aString);
ICBCDate::monthName
Returns a string containing the name of the month of this object.
IDL Syntax
long monthName( );
ICBCDate::monthNameFromNumber
Returns a string containing the name of the month for the month number within a year provided in the input parameter. The input parameter must be a number between 1 and 12.

If the input parameter is not recognizable, an empty string is returned.
IDL Syntax
string monthNameFromNumber(in long aDayIndex);
ICBCDate::monthNameFromString
Returns a string containing the name of the month for the date encoded in the input sting parameter. The input string parameter must conform to a format recognizable as a date. Refer to ICBCDate::initializeFromString for a description of supported formats.

If the input parameter is not recognizable, an empty string is returned.
IDL Syntax
string monthNameFromString(in string aDate);
ICBCDate::notEqualTo
The opposite of the operator==member.
IDL Syntax
boolean notEqualTo(in ICBCDate aDate);
ICBCDate::quarter
Returns a number for the quarter within the year for this object. Dates between January 1 and March 31 are in the first quarter, and so on.
IDL Syntax
long quarter( );
ICBCDate::quarterFromString
Returns a number for the quarter within the year for the date encoded in the input string parameter. The input string parameter must conform to a format recognizable as a date. Refer to ICBCDate::initializeFromString for a description of supported formats. Dates between January 1 and March 31 are in the first quarter, and so on.

If the input parameter is not recognizable, a value of −1 is returned.
IDL Syntax
long quarterFromString(in string aDate);
ICBCDate::year
Returns the year part of the date.
IDL Syntax
longYear( );
ICBCDate::yearFromString
Returns the year part of the date encoded in the input string parameter. The input string parameter must conform to a format recognizable as a date. Refer to ICBCDate::initializeFromString for a description of supported formats.

If the input parameter is not recognizable, a value of −1 is returned.
IDL Syntax
long yearFromString(in string aString);
ICBCDecimal Class
The class stores the value of a DB2 Decimal data type, or Oracle number type in which scale is less than or equal to precision, and positive with a maximum precision of 38. All access and manipulation of this value is through a public functional interface. The actual decimal value and its precision and scale are stored in private attributes.

Important

Throughout the description of ICBCDecimal, precision is the total number of digits in the decimal number; scale is the number of digits in the fractional part of the number–the number of digits that lie to the right of the decimal point.
IDL Interface Description
interface ICBCDecimal :IManagedLocal::ILocalOnly
{
// Object initialization CDB2 semantics)
boolean initializedFromString(in string aString, in short aPrecision,
   in short aScale, in char aDecimalChar);
boolean initializeFromString(in string aString, in char aDecimalChar);
boolean initializeFromDouble(in double aDouble, in short aPrecision,
   in short aScale);
boolean initializeFromDate(in float aFloat, in short aPrecision,
   in short aScale);
boolean initializeFromLong(in long aLong, in short aPrecision,
   in short aScale);
boolean initializeFromShort(in short aShort, in short aPrecision,
   in short aScale);
boolean initializeFromDecimal1(in ICBCDecimal aDecimal, in short aPrecision,
   in short aScale);
boolean initializeFromDecimal2(in ICBCDecimal aDecimal);
boolean initializeFromPackedDecimal(in string aString,in short aPrecision,
   in short aScale);
//Comparisons
boolean equalTo(in ICBCDecimal aDecimal);
boolean notEqualTo(in ICBCDecimal aDecimal);

```
boolean lessThan(in ICBCDecimal aDecimal);
boolean lessThanOrEqualTo(in ICBCDecimal aDecimal);
boolean greaterThan(in ICBCDecimal aDecimal);
boolean greaterThanOrEqualTo(in ICBCDecimal
    aDecimal);
//Query functions
string getAsFormattedString1(inout string aOutput,
    in char aDecimalCharacter);
string getAsFormattedString2(inout string aOutput,
    in char aDecimalCharcter);
string getAsFormattedString3(inout string aOutput,
    in char aDecimalCharaaer);
double getAsDouble( );
float getAsFloat( );
long getAsLong( );
short getAsShort( );
string getAsDigits(inout string aOutput);
string getAsPackedDecimal(inout string aOutput; inout
    short aPrecision,
    inout short aScale);
short getPrecision( ); short getScale( );
boolean isNegative( );
boolean isChanged( );
// Manipulation functions
ICBCDecimal assignFromDecimal(in ICBCDecial
    aDecimal);
ICBCDecimal assignFromDouble(in double aDouble);
ICBCDecimal assignFromFloat(in float aFloat);
ICBCDecimal assignFromLong(in long aLong;
ICBCDecimal assignFromShort(in short aShort);
ICBCDecimal increment(in ICBCDecimal aDecimal);
ICBCDecimal decrement(in ICBCDecimal aDecimal);
ICBCDecimal multiplyThisObjectBy(in ICBCDecimal
    aDecimal);
ICBCDecimal divideThisObjectBy(in ICBCDecimal
    aDecimal);
ICBCDecimal remainderInThisObject(in ICBCDecimal
    aDecimal);
ICBCDecimal addWithNewObject(in ICBCDecial
    aDecimal);
ICBCDecimal subtractWithNewObject(in ICBCDecimal
    aDecimal);
ICBCDecimal multiplyWithNewObject(in ICBCDecimal
    aDecimal);
ICBCDecimal divideWithNewObject(in ICBCDecimal
    aDecimal);
ICBCDecimal remainderWithNewObject(in ICBCDecimal
    aDecimal);
ICBCDecimal getPrecedingRemainder( );
void swapSign( );
boolean decimalOverflow( );
};
Supported Methods
ICBCDecimal::addWithNewObject
ICBCDecimal::assignFromDecimal
ICBCDecimal::assignFromDouble
ICBCDecimal::assignFromFloat
ICBCDecimal::assignFromLong
ICBCDecimal::assignFromShort
ICBCDecimal::_create
ICBCDecimal::decimalOverflow
ICBCDecimal::decrement
ICBCDecimal::divideThisObjectBy
ICBCDecimal::divideWithNewObject
ICBCDecimal::equalTo
ICBCDecimal::getAsDouble
ICBCDecimal::getAsFloat
ICBCDecimal::getAsFormattedString1
ICBCDecimal::getAsFormattedString2
ICBCDecimal::getAsFormattedString3
ICBCDecimal::getAsDigits
ICBCDecimal::getAsLong
ICBCDecimal::getAsPackedDecimal
ICBCDecimal::getAsShort
ICBCDecimal::getPreceedingRemainder
ICBCDecimal::getPrecision
ICBCDecimal::getScale
ICBCDecimal::greaterThan
ICBCDecimal::greaterThanOrEqualTo
ICBCDecimal::increment
ICBCDecimal::initializeFromDecimal1
ICBCDecimal::initializeFromDecimal2
ICBCDecimal::initializeFromDouble
ICBCDecimal :initializeFromFloat
ICBCDecimal::initializeFromLong
ICBCDecimal::initializeFromPackedDecimal
ICBCDecimal::initializeFromShort
ICBCDecimal::initializeFromString1
ICBCDecimal::initializeFromString2
ICBCDecimal::isChanged
ICBCDecimal::isNegative
ICBCDecimal::lessThan
ICBCDecimal::lessThanOrEqualTo
ICBCDecimal::multiplyWithNewObject
ICBCDecimal::multiplyThisObjectBy
ICBCDecimal::notEqualTo
ICBCDecimal::remainderInThisObject
ICBCDecimal::remainderWithNewObject
ICBCDecimal::subtractWithNewObject
ICBCDecimal::swapSign
ICBCDecimal::addWithNewObject
```

Adds the receiving object and the argument ICBCDecimal object and returns a new ICBCDecimal object containing the result. The original operand objects are unchanged. The precision of the result object is:

$$\min(38, \max(p1-s1, p2-s2)+\max(s1, s2)+1)$$

The scale is: $\max(s1, s2)$

IDL Syntax

ICBCDecimal addWithNewObject(in ICBCDecimal aDecimal);

Remarks

After a addWithNewObject operation, the change flag of the new object is set to TRUE. The change flag of the original object is unchanged.

It is the application's responsibility to delete the new object, freeing its memory, when no longer needed.

If the non-zero digits to the left of the decimal point in the result object would exceed (p−s)of the result, or if other errors occur that prevent the creation of the new object, an ICBCDecimal pointer with value −1 is returned.

ICBCDecimal::assignFromDecimal

Sets the value of the receiving ICBCDecimal object equal to that of the second ICBCDecimal object. The precision and scale of the receiving object are not changed.

IDL Syntax

ICBCDecimal assignFromDecimal(in ICBCDecimal aDecimal);

Remarks

If the non-zero digits to the left of the decimal point in the source object exceed (P1−s1) of the receiving object (i.e.,the whole number of the source object will not fit in the receiving object), the receiving object is unchanged, and a following invocation of decimalOverflow( ) on the receiving object function will return the value TRUE.

The scale of the source object is reduced to fit the scale of the receiving object, if necessary, by truncating digits from the right.

Any remainder value in the source object resulting from a preceding division operation is not transferred to the receiving object.

The change flag of the receiving object is set to TRUE.

Note that this operation preserves the precision and scale of the receiving object, as in a DB2 regular assignment between two decimal types. In contrast, the ICBCDecimal::initializeFromDecimal( ) function sets the precision and scale of the receiving object, is as in the DB2 DECIMAL built-in function.

ICBCDecimal::assignFromDouble

Sets the value of a receiving ICBCDecimal object equal to a double variable. The precision and scale of the object is not changed.

IDL Syntax

ICBCDecimal assignFromDouble(in double aDouble);

Remarks

The operand is converted to a temporary decimal object of precision 38. Numbers less than 0.5E-38 will be rounded to zero. The temporary decimal number is then converted to the precision and scale of the receiving ICBCDecimal object.

If the non-zero digits to the left of the decimal point in the source object exceed (p1-s1) of the receiving object (.e., the whole number portion of the source object will not fit in the receiving object), the receiving object is unchanged, and a following invocation of decimalOverflow( ) function on the receiving object will return the value TRUE.

ICBCDecimal::assignFromFloat

Sets the value of a receiving ICBCDecimal object equal to a float variable. The precision and scale of the object is not changed.

IDL Syntax

ICBCDecimal assignFromFloat(in float afloat);

Remarks

The operand is converted to a temporary decimal object of precision 38. Numbers less than 0.5E-38 will be rounded to zero. The temporary decimal number is then converted to the precision and scale of the receiving ICBCDecimal object.

If the non-zero digits to the left of the decimal point in the source object exceed (P1-s1) of In the receiving object (i.e., the whole number portion of the source object will not fit in the receiving object), the receiving object is unchanged, and a following invocation of decimalOverflow( ) function on the receiving object will return the value TRUE.

ICBCDecimal::assignFromLong

Sets the value of a receiving ICBCDecimal object equal to a long variable. The precision and scale of the object is not changed.

IDL Syntax

ICBCDecimal assignFromLong(in long aLong);

Remarks

The operand is converted to a temporary decimal number, of precision 11 which is then converted to the precision and scale of the receiving object.

If the non-zero digits to the left of the decimal point in the source object exceed (p1-s1) of the receiving object (i.e., the whole number portion of the source object will not fit in the receiving object), the receiving object is unchanged, and a following invocation of decimalOverflow( ) function will return the value TRUE on the receiving object.

ICBCDecimal::assignFromShort

Sets the value of a receiving ICBCDecimal object equal to a short variable. The precision and scale of the object is not changed.

IDL Syntax

ICBCDecimal assignFromShort(in short aShort);

Remarks

The operand is converted to a temporary decimal number, of precision 5 which is then converted to the precision and scale of the receiving object.

If the non-zero digits to the left of the decimal point in the source object exceed (p1-s1) of the receiving object (i.e., the whole number portion of the source object will not fit in the receiving object), the receiving object is unchanged, and a following invocation of decimalOverflow( ) function on the receiving object will return the value TRUE.

ICBCDecimal::_create

Returns a pointer to a new ICBCDecimal object. The object is initialized to zero, with precision=1 and scale=0.

ICBCDecimal::decimalOverflow

Following certain functions that potentially cause a precision overflow in a ICBCDecimal object, this function indicates whether an overflow did, in fact, take place. If the most recent initialization, assignment, or arithmetic operation caused an overflow, this function will return TRUE. Otherwise it returns FALSE. Intervening query or comparison operations will not affect the returned value.

IDL Syntax boolean decimalOverflow( );

ICBCDecimal::decrement

Subtracts the argument ICBCDecimal object from the receiving ICBCDecimal object and sets the value of the receiving object to the result. The precision and scale of the receiving object are reset.

The precision is given by:

$$\min(38, \max(p1-s1, p2-s2)+\max(s1, s2)+1)$$

The scale is given by:

$$\max(s1, s2)$$

If the non-zero digits to the left of the decimal point in the result exceed (p-s) of the result, the receiving object is not changed, and a following invocation of the function decimalOverflow( ) will return TRUE.

The change flag of the receiving object is set to TRUE.

IDL Syntax

ICBCDecimal decrement(in ICBCDecimal aDecimal);

ICBCDecimal::divideThisObjectBy

Divides the receiving object by the argument ICBCDecimal object, and sets the receiving object to the quotient. The precision and scale of the receiving object are reset.

The precision is 38.

The scale is given by:

$$38-p1+s1-s2$$

Scale may not be negative.

The division proceeds as far as possible within these limits for the quotient and then stops. Any remainder can be retrieved using the getPreceedingRemainder( ) function (see ICBCDecimal::getPreceedingRemainder).

This function does not cause any overflow conditions. However, the decimalOverflow( ) function is used to warn of zeroDivide situations, returning TRUE if a zeroDivide occurred in the preceding divideThisObjectBy( ) function, and FALSE if it did not.

After a divideThisObjectBy operation, the change flag of the receiving object is set to TRUE. For example, 200.00 (precision 5, scale 2) divided by 3.00 (precision 3, scale 2) returns a quotient of precision 38 and scale 33:

00066.666666666666666666666666666666666

A subsequent call to getPrecedingRemainder( ) on the same object returns a remainder with precision 38 and scale 35:

000.00000000000000000000000000000000200

IDL Syntax
ICBCDecimal divideThisObjecty(in ICBCDecimal aDecimal);
ICBCDecimal::divideWithNewObject Divides the receiving object and the argument ICBCDecimal object, and returns a new ICBCDecimal object containing the quotient. The original operand objects are unchanged.

The precision of the result object is 38.

The scale is: 38−p1+s1−s2

IDL Syntax
ICBCDecimal divideWithNewObject(in ICBCDecimal aDecimal);
Remarks

The division proceeds as far as possible within these limits and then stops. Any remainder can be retrieved using the getPrecedingRemainder( ) function (see ICBCDecimal::getPreceedingRemainder).For an example of a divide operation, see ICBCDecimal::divideThisObjectBy.

After a divideWithNewObject operation, the change flag of the new object is set to TRUE. The change flag of the original object is unchanged.

It is the application's responsibility to delete the new remainder object, freeing its memory, when no longer needed.

This function does not cause any overflow conditions, but may encounter a zeroDivide situation. If so, or if other errors occurred that prevented the creation of the new object, an ICBCDecimal pointer with value −1 is returned.

ICBCDecimal::equalTo

Returns TRUE if the value of the receiving ICBCDecimal object is equal to the other ICBCDecimal object.

IDL Syntax
boolean equalTo(in ICBCDecimal aDecimal);
ICBCDecimal::getAsDouble

Returns the value of the receiving object as a double. Since the double representation has maximum precision less than that of a decimal data type in DB2, accuracy of the object value may be lost.

IDL Syntax
double getAsDouble( );
ICBCDecimal::getAsFloat

Returns the value of the receiving object as a float. Since the float representation has maximum precision less than that of a decimal data type in DB2, accuracy of the object value may be lost.

IDL Syntax
double getAsFloat( );
ICBCDecimal::getAsFormattedString1

Returns the value of the receiving object as a formatted string. This function is equivalent to the CHAR( ) built-in function of DB2.

The application must supply a non-const pointer to a target storage area long enough to receive the formatted decimal number. The function returns a reference to this area.

IDL Syntax
string getAsFormattedString1(inout string aOutput,
  in char aDecimalCharacter);
Parameters
  aDecimalCharacter must be a single character to be used as the "decimal point" character in the output. The characters plus (+) and minus (−) are not permitted, and blanks are not permitted. The length of the output string is always precision +2, where precision is the current precision of the object. One of the additional character positions is always used for the decimal point. If required, the additional character position is used for a leading sign. If a sign is not required, the output string will have a trailing blank. Leading and trailing padding zeros are provided if necessary to fill the current precision and scale of the object.
aDecimalCharacter
  For example, assuming an aDecimalCharacter of '.':

| Value   | Precision | Scale | Prints as     |
|---------|-----------|-------|---------------|
| 45      | 2         | 0     | "45."         |
| 123.33  | 9         | 4     | "00123.3300"  |
| −123.33 | 9         | 4     | "−00123.3300" |

ICBCDecimal::getAsFormattedString2

Returns the value of the receiving object as a string formatted without leading zero padding. The application must supply a non-const pointer to a target storage area long enough to receive the formatted decimal number. The function returns a reference to this area.

IDL Syntax
string getAsFormattedString2(inout string aOutput,
  in char aDecimalCharacter);
Parameters
  aDecimalCharacter must be a single character to be used as the "decimal point" character in the output. The characters plus (+) and minus (−) are not permitted, and blanks are not permitted. The length of the output string is always precision +2, where precision is the current precision of the object. The leftmost character position is reserved for the sign, if necessary. The following positions contain the number, with an embedded decimal point, which is always present, even if the scale of the number is zero. The digits in the number are padded with leading blanks and trailing zeros to fill the full current precision and scale of the object. Finally, if leading blanks are present, the sign moves to a position immediately adjacent to the first digit (or decimal point).
aDecimalCharacter
  For example, assuming an aDecimalCharacter of '.', and showing blank as the character 'b':

| Value   | Precision | Scale | Prints as      |
|---------|-----------|-------|----------------|
| 45      | 2         | 0     | "b45."         |
| 123.33  | 9         | 4     | "bbb123.3300"  |
| −123.33 | 9         | 4     | "bb−123.3300"  |

ICBCDecimal::getAsFormattedString3

Returns the value of the receiving object formatted as a left justified string with a leading sign if required, and a decimal point only if there are digits that the to the right of the decimal point There are no leading or trailing zeros or blanks.

The application must supply a non-const pointer to a target storage area long enough to receive the formatted decimal number. The function returns a reference to this area.

IDL Syntax
string getAsFormattedString3(inout string aOutput,
   in char aDecimalCharacter);
Parameters
   aDecimalCharacter must be a single character to be used as the "decimal point" character in the output. The characters plus (+) and minus (−) are not permitted, and blanks are not permitted. The length of the output string is variable, containing only enough characters to hold the significant digits plus a sign and a decimal point if required. The precision and scale of the object are not reflected in the length output string. This format is suitable for providing to the Oracle TO_NUMBER function without the need for an associated "NUMBER format element" parameter.
aDecimalCharacter
   For example, assuming an aDecimalCharacter of '.':

| Value | Precision | Scale | Prints as |
|---|---|---|---|
| 45 | 2 | 0 | "b45." |
| 123.33 | 9 | 4 | "bbb123.3300" |
| −123.33 | 9 | 4 | "bb-123.3300" |

ICBCDecimal::getAsDigits
   Returns a null terminated string of length equal to the precision of the object, containing the digits in the value of the object, left justified, and without either decimal point or sign. Leading zeros are provided if necessary. For example, an object of precision and scale of 6 and 2 respectively, containing a value of −6.28 would return a string containing '000628'.
IDL Syntax
string getAsDigits(inout string aOutput);
Remarks
   The application must supply a non-const pointer to a target storage area long enough to receive the digits and null terminator. The function returns a reference to this area.
ICBCDecimal::getAsLong
   Returns the value of the receiving object as a long. All digits in the object value that lie to the right of the decimal point will be truncated. It is a user responsibility to ensure that the value of the object does not exceed the range for a long data type.
IDL Syntax
double getAsLong( );
ICBCDecimal::getAsPackedDecimal
   Returns the value of the object as a packed decimal string.
   The format of the returned packed string will one of the following:
   [dd]..[ds] if the number of digits is odd
   [0d]..[ds] if the number of digits is even
where [ ] denotes a single byte containing two 4-bit nibbles, d is a four-bit binary digit, 0 is a 4-bit binary zero, and s is a 4-bit sign representation. A hexadecimal value "C" denotes the positive sign, and "D" the negative sign. A sign is always present in the lower order four bits of the rightmost byte.
Parameters
   There is no decimal point embedded in the string. Output parameters are updated to describe the precision (aPrecision), and scale (aScale), of the packed string aScale.
IDL Syntax
string getAsPackedDecimal(inout string aOutput, inout short aPrecision,
   inout short aScale);

Remarks
   Because of the presence of the sign, and the packing of two digits per byte, strings with an even number of bytes will have a leading zero padding character.
   It is the responsibility of the application to provide a string of sufficient length to receive the packed string, with its sign and leading zero (if present). On return, a null terminator is appended to the end of the string.
ICBCDecimal::getAsShort
   Returns the value of the receiving object as a short. All digits in the object value that lie to the right of the decimal point will be truncated. It is a user responsibility to ensure that the value of the object does not exceed the range for a long data type.
IDL Syntax
double getAsShort( );
In ICBCDecimal::getPreceedingRemainder
   Returns a new object containing the remainder value of an immediately preceding division operation. This function may be invoked on an object that has been the subject of a divideThisObjectBy( ) operation, or on the new object produced by a divideWithNewObject( ) operation. This function will only return a meaningful result if used immediately after a divide operation. If used following any other manipulation function it will return an object with a zero value.
   The precision of the result object is 38.
   The scale is: 38−p1+s1
IDL Syntax
ICBCDecimal getPreceedingRemainder( );
Remarks
   If errors occur that prevent creation of the new object, a ICBCDecimal pointer with value −1 is returned.
   If a division operation has already been performed, this function is a more efficient way of obtaining the remainder than issuing a remainderInThisObject( ) or remainderWithNewObject( ). This function retrieves the remainder that was cached in the object as a by-product of the preceding divide operation, whereas the latter two functions perform an implicit divide to calculate the remainder.
   It is the application's responsibility to delete the new remainder object, freeing its memory, when no longer needed.
ICBCDecimal::getPrecision
   Returns the precision of the object—the maximum number of digits that make up the value of the object. Precision is conceptually similar to the precision of a DB2 column. For example, an object with precision and scale of 5 and 2 respectively can store numbers up to value 999.99, but could not store numbers 1000.00, nor 999.991, nor 99.991. Precision is set by an ICBCDecimal::initialize..( ) function, and is generally retained by the object through its lifetime unless changed by arithmetic functions.
IDL Syntax
short getPrecision( );
ICBCDecimal::getScale
   Returns the scale of the object. Scale, like precision (see ICBCDecimal::getPrecision), is set by the ICBCDecimal::initialize..( ) functions, and is generally retained by the object through its lifetime unless changed by arithmetic operations.
IDL Syntax
short getScale( );
ICBCDecimal::greaterThan
   Returns TRUE if the value of the receiving ICBCDecimal object is greater than the other ICBCDecimal object.

IDL Syntax
boolean greaterThan(in ICBCDecimal aDecimal);
ICBCDecimal::greaterThanOrEqualTo
Returns TRUE if the value of the receiving ICBCDecimal object is greater than or equal to the other ICBCDecimal object.
IDL Syntax
boolean greaterThanOrEqualTo(in ICBCDecimal aDecimal);
ICBCDecimal::increment
Adds the argument ICBCDecimal object to the receiving ICBCDecimal object and sets the value of the receiving object to the result. The precision and scale of the receiving object are reset. The precision is given by:

min(38, max(p1−s1, p2−s2)+max(s1, s2)+1)

The scale is given by:

max(s1, s2)

If the non-zero digits to the left of the decimal point in the result exceed (p−s) of the result, the receiving object is not changed, and a following invocation of the function decimalOverflow( ) will return TRUE.

After an increment operation, the change flag of the receiving object is set to TRUE.
IDL Syntax
ICBCDecimal increment(in ICBCDecimal aDecimal);
ICBCDecimal::initializeFromDecimal1
Initializes the receiving object with the value of the argument ICBCDecimal object, and sets its precision and scale to the values of the parameters.
IDL Syntax
boolean initializeFromDecimal1(in ICBCDecimal aDecimal
   in short precision,
   in short scale);
Remarks
This function requires parameters to be explicitly specified for the precision and scale of the receiving object precision must be a number between zero and 38. If zero, a default value of 15 is assumed scale must be a number between 0 and the value of precision. If precision is zero, the value of scale is ignored and the scale of the object is taken to be zero. The value of precision—scale must be sufficient to contain the digits to the left of the decimal point in the source ICBCDecimal object. If scale is insufficient to contain the digits to the right of the decimal point, those digits will be truncated from the right.

The difference between this function and ICBCDecimal::assignFromDecimal( ) is that this function sets the precision and scale of the receiving object, whereas ICBCDecimal::assignFromDecimal( ) leaves the existing precision and scale of the receiving object unchanged.

If the object can be successfully initialized from the other Decimal object, TRUE is returned and any existing value in the object is replaced. If the initialization cannot be performed, FALSE is returned and the state of the object is unchanged, except that, if the FALSE return resulted from a numeric overflow, a following invocation of the decimalOverflow( ) function against the object will return the value TRUE.
ICBCDecimal::initializeFromDecimal2
Initializes the receiving object with the value of the argument ICBCDecimal object, and sets its precision and scale to the values of the parameters.
IDL Syntax
boolean initializeFromDecimal2(in ICBCDecimal aDecimal);

Remarks
This function has no explicit parameters for precision and scale. The precision and scale of the receiving object are set to the same values as the source Decimal object.

The difference between this function and ICBCDecimal::assignFromDecimal( ) is that this function sets the precision and scale of the receiving object, whereas ICBCDecimal::assignFromDecimal( ) leaves the existing precision and scale of the receiving object unchanged.

If the object can be successfully initialized from the other Decimal object, TRUE is returned and any existing value in the object is replaced. If the initialization cannot be performed, FALSE is returned and the state of the object is unchanged, except that, if the FALSE return resulted from a numeric overflow, a following invocation of the decimalOverflow( ) function against the object will return the value TRUE.
ICBCDecimal::initializeFromDouble
Initializes the receiving object with the value of an argument of type double, and sets its precision and scale.
IDL Syntax
boolean initializeFromDouble(in double aDouble in short precision,
   in short scale);
Parameters
Precision
Precision must be a number between zero and 38. A zero value implies that the application is not supplying values for precision or scale. In this case, a default value of 15 is assumed.
scale
Scale must be a number between 0 and the value of precision. If precision is zero, the value of scale is ignored and a value of zero is assumed.
Remarks
If the the object can be successfully initialized with the numeric operand, TRUE is returned and any existing value in the object is replaced. If the initialization cannot be performed, FALSE is returned and the state of the object is unchanged, except that, if the FALSE return resulted from a numeric overflow, a following invocation of the decimalOverflow( ) function against the object will return the value TRUE.

Precision and scale must be such that (precision−scale) is sufficient to contain the digits to the left of the decimal point in the numeric operand. If scale is insufficient to contain the digits to the right of the decimal point, those digits will be truncated from the right.
ICBCDecimal::initializeFromFloat
Initializes the receiving object with the value of an argument of type float, and sets its precision and scale.
IDL Syntax
boolean initializeFromFloat(in float afloat in short precision,
   in short scale);
Parameters
Precision
Precision must be a number between zero and 38. A zero value implies that the application is not supplying values for precision or scale. In this case, a default value of 15 is assumed.
scale
Scale must be a number between 0 and the value of precision. If precision is zero, the value of scale is ignored and a value of zero is assumed.
Remarks
If the the object can be successfully initialized with the numeric operand, TRUE is returned and any existing value in the object is replaced. If the initialization cannot be performed, FALSE is returned and the state of the object is unchanged, except that, if the FALSE return resulted from a numeric overflow, a following invocation of the decimalOverflow( ) function against the object will return the value TRUE.

Precision and scale must be such that (precision−scale) is sufficient to contain the digits to the left of the decimal point in the numeric operand. If scale is insufficient to contain the digits to the right of the decimal point, those digits will be truncated from the right.

ICBCDecimal::initializeFromLong

Initializes the receiving object with the value of an argument of type long, and sets its precision and scale.

IDL Syntax boolean initializeFromLong(in long aLong in short precision, in short scale);

Parameters

Precision

Precision must be a number between zero and 38. A zero value implies that the application is not supplying values for precision or scale. In this case, a default value of 11 is assumed.

scale

Scale must be a number between 0 and the value of precision. If precision is zero, the value of scale is ignored and a value of zero is assumed.

Remarks

If the the object can be successfully initialized with the numeric operand, TRUE is returned and any existing value in the object is replaced. If the initialization cannot be performed, FALSE is returned and the state of the object is unchanged, except that, if the FALSE return resulted from a numeric overflow, a following invocation of the decimalOverflow( ) function against the object will return the value TRUE.

Precision and scale must be such that (precision−scale) is sufficient to contain the digits in the numeric operand.

ICBCDecimal::initializeFromPackedDecimal

Accepts a value in the form of a packed decimal string.

IDL Syntax boolean initializeFromPackedDecimal(in string aString, in short aPrecision, in short aScale);

Parameters must have one of the following forms:

[dd][dd] . . . [ds] if number of digits is odd

[0d][dd] . . . [ds] if number of digits is even

Where [ ] denotes a byte containing two 4-bit "nibbles", d is a four-bit binary digit, 0 is a 4-bit binary zero, and s is a 4-bit sign representation. The hexadecimal value "C" is interpreted as the positive sign, and "D" as the negative sign. There is no embedded decimal point. The scale of the object is defined by the scale input argument aScale. The number of digits unpacked from aString is defined by the aPrecision argument. The sign is always present in the lower order four bits of the rightmost byte. Because of the presence of the sign, and the packing of two digits per byte, strings with an even number of bytes will have a leading zero padding character.

aString

This format is consistent with that used by DB2 for packed decimal variables passed to an application program.

Precision

This must be a number between zero and 38, and must always be present. There is no default.

scale

This parameter must be a number between 0 and the value of precision. It indicates the scale number of digits that lie to the right of the decimal point. It must always be present. There is no default. A null terminator character on the packed string is not required, but is tolerated if present.

Remarks

If the string is a valid packed decimal representation and the object is successfully initialized, TRUE is returned and any existing value in the object is replaced. Returns FALSE if the parameter is invalid. If FALSE is returned the state of the object is unchanged, except that, if the FALSE return resulted from a numeric overflow, a following invocation of the decimalOverflow( ) function against the object will return the value TRUE.

ICBCDecimal::initializeFromShort

Initializes the receiving object with the value of an argument of type short, and sets its precision and scale.

IDL Syntax boolean initializeFromShort(in short aShort in short precision, in short scale);

Parameters precision

Precision must be a number between zero and 38. A zero value implies that the application is not supplying values for precision or scale. In this case, a default value of 5 is assumed.

scale

Scale must be a number between 0 and the value of precision. If precision is zero, the value of scale is ignored and a value of zero is assumed.

Remarks

If the the object can be successfully initialized with the numeric operand, TRUE is returned and any existing value in the object is replaced. If the initialization cannot be performed, FALSE is returned and the state of the object is unchanged, except that, if the FALSE return resulted from a numeric overflow, a following invocation of the decimalOverflow( ) function against the object will return the value TRUE.

Precision and scale must be such that (precision−scale) is sufficient to contain the digits in the numeric operand.

ICBCDecimal::initializeFromString1

Accepts a value for this decimal object in the form of a string, specified values for precision and scale of the object, and the character that is used in the string as the decimal point (if any).

IDL Syntax boolean initializeFromString1(in string aString, in short precision, in short scale, in char decimalChar);

Parameters aString

The parameter aString must be of the form:

[spaces][sign][zeros][digits][decimal point][digits][zeros]&lbrk.spaces]

decimalChar

A negative sign is ignored if the value represented by the string is zero. decimalChar must be a single character that is used in aString to represent the decimal point. The characters plus (+) and minus (−) are not permitted, and blanks are not permitted.

precision

Precision must be a number between zero and 38. If the value is zero, a default precision of 15 and a default scale of zero are used (the parameter for scale is ignored in this case). Otherwise the parameter values for precision and scale are used.

scale

Scale must be a number between 0 and the value of precision. It indicates the number of digits that lie to the right of the decimal point. Note that if the parameter precision is zero, the value of scale is ignored and a default scale of zero is used.

Remarks

If the parameters are valid, TRUE is returned and any existing value in the object is replaced. If the parameter is invalid, FALSE is returned and the state of the object is unchanged, except that, if the FALSE return resulted from a numeric overflow, a following invocation of the decimalOverflow( ) function against the object will return the value TRUE.

Precision and scale must be such that (precision−scale) is sufficient to contain the non-zero characters to the left of the decimal point in aString. If scale is insufficient to contain the characters to the right of the decimal point, those characters will be truncated from the right.

ICBCDecimal::initializeFromString2

Accepts a value for this decimal object in the form of a string, and the character used in the string as a decimal point.

IDL Syntax boolean initializeFromString2(in string aString, in char aDecimalChar);

Remarks

The precision and scale of the object are set to the actual precision and scale of the string parameter. The precision is the total number of digits, including leading and trailing zeros. The scale is the number of digits to the right of the decimal point, including trailing zeros. In other respects, this function behaves the same as ICBCDecimal::initializeFromString1( ).

If the input parameters are valid, TRUE is returned and any existing value in the object is replaced. If the parameter is invalid, FALSE is returned and the state of the object is unchanged, except that, if the FALSE return resulted from a numeric overflow, a following invocation of the decimalOverflow( ) function against the object will return the value TRUE.

ICBCDecimal::isChanged

Returns a boolean indicating whether the the value of the receiving object has been changed since its initialization. All initialization functions set a changed flag in the object to FALSE. All arithmetic and assignment functions set the flag TRUE. Query functions do not affect the changed flag.

IDL Syntax boolean isChanged( );

ICBCDecimal::isNegative

Returns a boolean indicating whether the the value of the receiving object is less than zero.

IDL Syntax boolean isNegative ( );

ICBCDecimal::lessThan

Returns TRUE if the value of the receiving ICBCDecimal object is less than the other ICBCDecimal object.

IDL Syntax boolean lessThan(in ICBCDecimal aDecimal);

ICBCDecimal::lessThanOrEqualTo

Returns TRUE if the value of the receiving ICBCDecimal object is less than or equal to the other ICBCDecimal object.

IDL Syntax boolean lessThanOrEqualTo(in ICBCDecimal aDecimal);

ICBCDecimal::multiplyWithNewObject

Multiplies the receiving object by the argument ICBCDecimal object and returns a new ICBCDecimal object containing the result. The original operand objects are unchanged. The precision of the result object is:

$$\min(38, p1+p2)$$

The scale is: $\min(38, s1+s2)$

IDL Syntax

ICBCDecimal multiplyWithNewObject(in ICBCDecimal aDecimal);

Remarks

After a multiplyWithNewObject operation, the change flag of the new object is set to TRUE. The change flag of the original object is unchanged.

It is the application's responsibility to delete the new object, freeing its memory, when no longer needed.

If the non-zero digits to the left of the decimal point in the result object would exceed (p−s) of the result, or if other errors occur that prevent the creation of the new object, an ICBCDecimal pointer with value −1 is returned.

ICBCDecimal::notEqualTo

The opposite of the operator==member.

IDL Syntax boolean notEqualTo(in ICBCDecimal aDecimal);

ICBCDecimal::multiplyThisObjectBy

Multiplies the receiving object by the argument ICBCDecimal object, and sets the receiving object to the result. The precision and scale of the receiving object are reset. The precision is given by:

$$\min(38, p1+p2)$$

The scale is given by:

$$\min(38, s1+s2)$$

If the non-zero digits to the left of the decimal point in the results exceed (p−s) of the result, the object is not changed, and a following invocation of the function decimalOverflow( ) will return TRUE.

The change flag of the receiving object is set to TRUE.

IDL Syntax

ICBCDecimal multiplyThisObjectBy(in ICBCDecimal aDecimal);

ICBCDecimal::remainderInThisObject

Divides the receiving object by the argument ICBCDecimal object, and sets the receiving object to the remainder of the division operation. The precision and scale of the receiving object are reset.

The change flag of the receiving object is set to TRUE.

The precision is: 38.

The scale is: 38−p1+s1

IDL Syntax

ICBCDecimal remainderInThisObject(in ICBCDecimal aDecimal);

ICBCDecimal::remainderWithNewObject

Divides the receiving object by the argument ICBCDecimal object and returns a new ICBCDecimal object containing the remainder. The original operand objects are unchanged.

The precision of the result object is 38.

The scale is: 38−p1+s1

IDL Syntax
ICBCDecimal remainderWithNewObject(in ICBCDecimal aDecimal);
Remarks

This function does not cause any overflow conditions, but may encounter a zeroDivide situation. If so, or if errors occur that prevent the recreation of the new object, a ICBCDecimal pointer with value −1 is returned.

After a remainderWithNewObject operation, the change flag of the new object is set to TRUE. The change flag of the original object is unchanged.

It is the application's responsibility to delete the new object, freeing its memory, when no longer needed.
ICBCDecimal::subtractWithNewObject Subtracts the argument ICBCDecimal object from the receiving object and returns a new ICBCDecimal object containing the result. The original operand objects are unchanged. The precision of the result object is:

$$\min(38, \max(p1-s1, p2-s2)+\max(s1, s2)+1)$$

The scale is: $\max(s1, s2)$
IDL Syntax
ICBCDecimal subtractWithNewObject(in ICBCDecimal aDecimal);
Remarks After a subtractWithNewObject operation, the change flag of the new object is set to TRUE. The change flag of the original object is unchanged.

It is the applications responsibility to delete the new object, freeing its memory, when no longer needed.

If the non-zero digits to the left of the decimal point in the result object would exceed (p−s) of the result, or if other errors occur that prevent the creation of the new object, an ICBCDecimal pointer with value −1 is returned.
ICBCDecimal::swapSign This function is effectively a unary minus operator which reverses the sign of this ICBCDecimal object.
IDL Syntax
void swapSign( );
ICBCDuration Class The class ICBCDuration represents the "Labeled Duration", "Date Duration", "Time Duration", and "Timestamp Duration" constructs of DB2. Duration is a complementary data type to Date, Tune, and Timestamp, and participates in SQL expressions. However, it is not, itself, stored in DB2 tables.

The class holds the value of a duration, and a record of whether this duration value is in units of years, months, days, hours, minutes seconds, or microseconds. The value can also be of a composite type defining a "Date Duration" of the form yyyymmdd, a "Time Duration" of the form hhmmss, or a "Timestamp Duration" of the form yyyymmddhhmmsszzzzzz.

Arithmetic between two ICBCDuration classes is not supported (This is consistent with DB2 support of Durations). However, they can be compared, and a unary minus operator (which swaps the sign) is provided.
IDL Interface Description
interface ICBCDuration :IManagedLocal::ILocalOnly
{
enum durationType {YEARS, MONTHS, DAYS, HOURS, MINUTES, SECONDS, MICROSECONDS, DATE, TIME, TIMESTAMP};
// Object initialization
// 1. Initializer for YEAR, MONTH, DAY, HOUR, MINUTE, SECOND
// and MICROSECOND durations
boolean initializeLabeledDuration(in long aDuration,
    in ICBCDuration::durationType aType);
//Initializer for DATE and TIME durations boolean initializeDateTimeDuration(in long aValue1, in long aValue2,
    in long aValue3,
    in boolean aNegativeFlag,
    in ICBCDuration::durationType aType);
//Initialize for TIMESTAMP durations
boolean initializeTimestampDuration(in long aValue1, in long aValue2,
    in long aValue3, in long aValue4,
    in long aValue5, in long aValue6,
    in long aValue7,
    in boolean aNegativeFlag);
/*Comparisons*/
boolean equalTo(in ICBCDuration aDuration);
boolean notEqualTo(in ICBCDuration aDuration);
boolean lessThan(in ICBCDuration aDuration);
boolean lessThanOrEqualTo(in ICBCDuration aDuration);
boolean greaterThan(in ICBCDuration aDuration);
boolean greaterThanOrEqualTo(in ICBCDuration aDuration);
/*Query functions*/
ICBCDuration::durationType getType( );
boolean isNegative( );
long microsecond( );
long second( );
long minute( );
long hour( );
long day( );
long month( );
long year( );
long size(in long aIntervalType);
string formattedString(inout string aString);
/*Manipulation functions*/
void assignFromDuration(in ICBCDuration aDuration);
void swapsign( ); // unary minus
};
Supported Methods
ICBCDuration::_create
ICBCDuration::initalizeLabeledDuration
ICBCDuration::initializeDateTimeDuration
ICBCDuration::initializeTimestampDuration
ICBCDuration::equalTo
ICBCDuration::notEqualTo
ICBCDuration::lessThan
ICBCDuration::lessThanOrEqualTo
ICBCDuration::greaterThan
ICBCDuration::greaterThanOrEqualTo
ICBCDuration::formattedString
ICBCDuration::getType
ICBCDuration::isNegative
ICBCDuration::microSecond
ICBCDuration::second
ICBCDuration::minute
ICBCDuration::hour
ICBCDuration::day
ICBCDuration::month
ICBCDuration::year
ICBCDuration::assignFromDuration
ICBCDuration::size
swapSign
ICBCDuration::assignFromDuration Sets all state data of this ICBCDuration object equal to the the other ICBCDuration object.

IDL Syntax
void assignFromDuration(in ICBCDuration aDuration);
ICBCDuration::_create
　　Returns a pointer to a new ICBCDuration object. The object is initialized to a type of "YEARS" and a value of zero.
ICBCDuration::day
　　!Returns the day part of the ICBCDuration.
IDL Syntax
long day( );
ICBCDuration::equalTo
　　Returns TRUE if all state data of this ICBCDuration object is equal to the other ICBCDuration object.
IDL Syntax
boolean equalTo(in ICBCDuration aDuration);
ICBCDuration::formattedString
　　Returns the value of a DATE type duration as a string of the form yyyymmdd, a TIME type duration in the form hhmmss, or a TIMESTAMP duration in the form yyyymmddhhmmssmmmmmm. For other duration types this function returns a null string.
IDL Syntax
string formattedString(inout string aString);
　　The application must supply a non-const pointer to a target storage area long enough to receive the formatted date. The function returns a reference to this area, enabling the function to be nested in stream operations.
ICBCDuration::greaterThan
　　Returns TRUE if the value of this ICBCDuration object is greater than the other ICBCDuration object.
IDL Syntax
boolean greaterThan(in ICBCDuration aDuration);
ICBCDuration::greaterThanOrEqualTo
　　Returns TRUE if the value of this ICBCDuration object is greater than or equal to the other ICBCDuration object.
IDL Syntax
boolean greaterThanOrEqualTo(in ICBCDuration aDuration);
ICBCDuration::getType
　　Returns the type of this ICBCDuration. Returned values can be DATE, TIME, YEARS, MONTHS, DAYS, HOURS, MINUTES, SECONDS, MICROSECONDS.
IDL Syntax
ICBCDuration::durationType getType( );
ICBCDuration::hour
　　Returns the hour part of the ICBCDuration.
IDL Syntax
long hour( );
ICBCDuration::initializeDateTimeDuration
　　Accepts three numeric values, an indicator of the sign of the duration (positive or negative) and an indicator of the duration type.
IDL Syntax
I: boolean initializeDateTimeDuration(in long aValue1,
　　in long aValue2,
　　in long aValue3,
　　in boolean aNegativeFlag,
　　in ICBCDuration::durationType aType);
　　If the type indicator is DATE, then aValue1, aValue2, aValue3 must supply valid values for years, months, and days, respectively. Each value must be a positive number, or zero. If the supplied parameters are valid, returns TRUE, else returns FALSE.
　　If type indicator is TIME, then aValue1, aValue2, aValue3 must supply valid values for hours, minutes, and seconds, respectively.
　　Each value must be a positive number, or zero. If the supplied parameters are valid, returns TRUE, else returns FALSE.
ICBCDuration::initializeLabeledDuration
　　Accepts a single numeric value, and an indicator of the type of duration.
IDL Syntax
boolean initializeLabeledDuration(in long aDuration,
　　in ICBCDuration::durationType aType);
　　The type indicator can be: YEARS, MONTHS, DAYS, HOURS, MINUTES, SECONDS, MICROSECONDS. The supplied values must be a positive number or zero. If the numeric value is valid, returns TRUE, otherwise returns FALSE. If the values are valid, any existing value in the object is replaced.
ICBCDuration::initializeTimestampDuration
　　Accepts seven numeric values, and an indicator of the sign of the duration (positive or negative).
IDL Syntax
boolean initializeTimestampDuration(in long aValue1,
　　in long aValue2,
　　in long aValue3,
　　in long aValue4,
　　in long aValue5,
　　in long aValue6,
　　in long aValue7,
　　in boolean aNegativeFlag);
　　The numeric values represent the years, months, days, hours, minutes, seconds, and microseconds portions of the timestamp duration. They must be positive numbers or zeros. If the supplied parameters are valid, returns TRUE, else returns FALSE.
ICBCDuration::isNegative
　　Returns a Boolean TRUE is this object's value is negative. Otherwise returns FALSE;
IDL Syntax
boolean isNegative( );
ICBCDuration::lessThan
　　Returns TRUE if the value of this ICBCDuration object is less than the other ICBCDuration object.
IDL Syntax
boolean lessThan(in ICBCDuration aDuration);
ICBCDuration::lessThanOrEqualTo
　　Returns TRUE if the value of this ICBCDuration object is less than or equal to the other ICBCDuration object
IDL Syntax
boolean lessThanOrEqualTo(in ICBCDuration aDuration);
ICBCDuration::microSecond
　　Returns the microseconds part of the ICBCDuration.
IDL Syntax
long microSecond( );
ICBCDuration::minute
　　Returns the minute part of the ICBCDuration.
IDL Syntax
long minute( );
ICBCDuration::month
　　Returns the month part of the ICBCDuration.
IDL Syntax
long month( );
ICBCDuration::notEqualTo
　　The opposite of the equalTo operation.
IDL Syntax
boolean notEqualTo(in ICBCDuration aDuration);
ICBCDuration::second
　　Returns the seconds part of the ICBCDuration.
IDL Syntax
long seconds( );
ICBCDuration::size
　　Equivalent to the DB2 TIMESTAMPDIFF built-in function.

IDL Syntax
long size(in long aIntervalType);
Remarks
Returns the value of the timestamp duration converted to the interval type specified in the input parameter. If the parameter is not valid, a value of −1 is returned. Valid parameter values, and associated interval types are:
1 Fractions of a second.
2 Seconds.
4 Minutes.
8 Hours.
16 Days.
32 Weeks.
64 Months.
128 Quarters.
256 Years.

The conversion is not precise. A standard length year and month are assumed, taking no account of leap years. Conversion factors used are as follows:
365 days per year.
30 days per month.
24 hours per day.
60 minutes per hour.
60 seconds per minute.

ICBCDuration::year
Returns the year part of the ICBCDuration.
IDL Syntax
long year( ); swapSign
This function is effectively a unary minus operator which reverses the sign of this ICBCDuration object.
IDL Syntax
void swapSign( );

ICBCTime Class
The class stores the value of a time-of-day. All access and manipulation of this time is through a public functional interface. The actual time value and its format are stored in private attributes.
IDL Interface Description
interface ICBCTime :IManagedLocal::ILocalOnly
{
/*Object initialization (DB2 semantics)*/
boolean initializeFromString(in string aTime);
boolean initializeFromTimestamp(in ICBCTimestamp aTimestamp);
boolean initializeFromValues(in long aHour,
  in long aMinute,
  in long aSecond);
// Comparisons
boolean equalTo(in ICBCTime aTime);
boolean notEqualTo(in ICBCTime aTime);
boolean lessThan(in ICBCTime aTime);
boolean lessThanOrEqualTo(in ICBCTime aTime);
boolean greaterThan(in ICBCTime aTime);
boolean greaterThanOrEqualTo(in ICBCTime aTime);
// Query functions (DB2 semantics)
enum OutputFormat {ISO, USA, EUR, JIS, LOC};
string formattedString(inout string aOutput,
  in ICBCTime::OutputFormat aFormat);
long second( );
long minute( );
long hour( );
boolean isObjectChanged( );
// Manipulation functions (DB2 semantics)
void assignFromTime(in ICBCTime aTime);
void increment(in ICBCDuration aDuration);
void decrement(in ICBCDuration aDuration);
long timeOverflow( );
ICBCDuration intervalFromTime(in ICBCTime aTime);
ICBCDuration intervalFromString(in string aTime);
}
Supported Methods
ICBCTime::__create
ICBCTime::initializeFromString
ICBCTime::initializeFromTimestamp
ICBCTime::initializeFromValues
ICBCTime::equalTo
ICBCTime::notEqualTo
ICBCTime::lessThan
ICBCTime::lessThanOrEqualTo
ICBCTime::greaterThan
ICBCTime::greaterThanOrEqualTo
ICBCTime::formattedString
ICBCTime::second
ICBCTime::minute
ICBCTime::hour
ICBCTime::isObjectChanged
ICBCTime::assignFromTime
ICBCTime::increment
ICBCTime::decrement
ICBCTime::timeOverflow
ICBCTime::interval
ICBCTime::assignFromTime
Sets all state data in this ICBCTime object equal to the second ICBCTime object. The change flag of this object is set to TRUE.
IDL Syntax
void assignFromTime(in ICBCTime aTime);
ICBCTime::__create
Returns a pointer to a new ICBCTime object. The object is initialized to the current local time.
ICBCTime::decrement
Subtracts a ICBCDuration from the value of this ICBCTime object.
IDL Syntax
void decrement(in ICBCDuration aDuration);
Remarks
This operation is performed essentially as the inverse of the increment operation.
When a duration of type TIME is subtracted from a time, the time is decremented by the specified number of hours, minutes, and seconds, in that order.
If the hours value of the result of a decrement operation is negative, then enough whole periods of 24 hours are added to the value to make it positive. The number of 24 hour periods (i.e., days) thus added can be retrieved as a negative number using the timeOverflow( ) function.
Although a ICBCTime object with a value (expressed in ISO format) of 24.00.00 can be input to an increment or decrement operation, a time of 24.00.00 will never be returned as the result of the operation. Thus 24.00.00 plus or minus a zero duration will return the time 00.00.00.
The change flag of this object is set to TRUE.
ICBCTime::equalTo
Returns TRUE if the time in this ICBCTime object is equal to the other ICBCTime object. Note: Although 24.00.00 and 00.00.00 both represent midnight, ICBCTime considers that 24.00.00>00.00.00.
IDL Syntax
boolean equalTo(in ICBCTime aTime);
ICBCTime::formattedString
Returns the time value of this object as a string in a specified format. The parameter OutputType must take one the values: ISO, USA, EUR, JIS. Formats are as described for the function ICBCTime::initializeFromString( ). The LOC site-defined option described in the DB2 manual is not supported by ICBCTime.
IDL Syntax
string formattedString(inout string aOutput,
  in ICBCTime::OutputFormat aFormat);
The application must supply a non-const pointer to a target storage area long enough to receive the formatted time. The function returns a reference to this area.
ICBCTime::greaterThan
Returns TRUE if the time stored in this ICBCTime object is greater than the other ICBCTime object.
IDL Syntax
boolean greaterThan(in ICBCTime aTime);
ICBCTime::greaterThanOrEqualTo
Returns TRUE if the time stored in this ICBCTime object is greater than or equal to the other ICBCTime object.
IDL Syntax
boolean greaterThanOrEqualTo(in ICBCTime aTime);
ICBCTime::hour
Returns the hour part of the time.
IDL Syntax
long hour( );
ICBCTime::increment
Adds a ICBCDuration to the value of this ICBCTime object.
IDL Syntax
void increment(in ICBCDuration aDuration);
Remarks
If a duration of type HOURS is added to a time, only the hours portion of the time is affected. The minutes and seconds are unchanged.
Similarly, if a duration of type MINUTES is added to the time, only minutes and, if necessary, hours are affected.
Adding a duration of type SECONDS will, of course, affect the seconds portion of the time, and potentially the minutes and hours.
When a duration of type TIME is added to a time, the time is incremented by the specified number of hours, minutes, and seconds, in that order.
If the hours value of the result of an increment operation is greater than 24 hours, then the hours value is divided by 24 and the remainder stored in the hours value. The quotient of the division (the number of whole 24 hour periods or days in the original hours value) can be retrieved using the timeOverflow( ) function.
Although a ICBCTime object with a value (expressed in ISO format) of 24.00.00 can be input to an increment or decrement operation, a time of 24.00.00 will never be returned as the result of the operation. Thus 24.00.00 plus or minus a zero duration will return the time 00.00.00. The change flag of this object is set to TRUE.
ICBCTime::initializeFromString
Accepts a value for the time in the form of a string. Any existing value in the object is replaced. Returns TRUE if the string is a valid time representation and the object is successfully initialized. Returns FALSE if the parameter is invalid. If FALSE is returned the state of the object is unchanged.
IDL Syntax
boolean initializeFromString(in string aTime);
Parameters
  The string must be either:
    A valid string representation of a time, in one of the following valid forms.
      International Standards Organization (ISO) (hh.mm.ss).
      IBM USA standard (USA) (hh:mm AM or PM).
      IBM European standard (EUR) (hh.mm.ss).
      Japanese Industrial Standard Christian Era (JIS) (hh:mm.ss).
  aTime
    Leading and trailing blanks are acceptable provided the string length is less than 20 characters. Leading zeros can be omitted from the hours portion, and in ISO, EUR and JIS the seconds portion can be omitted completely. In the USA format, the minutes can be omitted. Zeros are assumed for omitted portions. In the USA time format, the hour cannot be greater than 12 and cannot be 0 except for the special case of 00:00 AM. Only SBCS characters may be present in the string.
    A string representation of a timestamp.
      Any of the string forms acceptable by the ICBCTimestamp::initializeFromString( ) function are acceptable. For details refer to that function. Briefly, the forms include:
        A punctuated string: yyyy-mm-dd-hh.mm.ss.nnnnnn.
        A 14 byte string without punctuation, of the form: yyyymmddhhmmss.
ICBCTime::initializeFromTimestamp
Initialize this object from the time portion of a Timestamp object.
IDL Syntax
boolean initializeFromTimestamp(in ICBCTimestamp aTimestamp);
ICBCTime::initializeFromValues
Accepts the time in the form of three separate value parameters for hour, minute, and second.
The values must make a valid time.
Returns TRUE if the values are a valid time representation, FALSE otherwise. If FALSE is returned, the state of the object is unchanged.
IDL Syntax
boolean initializeFromValues(in long aHour, in long aMinute,
  in long aSecond);
ICBCTime::interval
Calculates the Duration between two ICBCTime objects. The result is a pointer to a new ICBCDuration object of type TIME.
If the interval between TIME1 and TIME2 is required, and TIME1 is greater than or equal to TIME2, the operation is performed by subtracting TIME2 from TIME1. If, however, TIME1 is less than TIME2, TIME1 is subtracted from TIME2, and the sign of the result is made negative. The following procedural description clarifies the steps involved in the operation result=TIME1−TIME2.
If SECOND(TIME2)<=SECOND(TIME1)
  then SECOND(RESULT=SECOND(TIME1)−SECOND (TIME2).
If SECOND(TIME2)>SECOND(TIME1)
  then SECOND(RESULT=60+SECOND(TIME1)− SECOND(TIME2).
  MINUTE(TIME2) is then incremented by 1.
If MINUTE(TIME2)<MINUTE(TIME1)
  then MINUTE(RESULT)=MINUTE(TIME1)−MINUTE (TIME2).
If MINUTE(TIME2)>MINUTE(TIME1)
  then MINUTE(RESULT)=60+MINUTE(TIME1)− MINUTE(TIME2).
  HOUR(TIME2) is then incremented by 1.
HOUR(RESULT)=HOUR(TIME1)−HOUR(TIME2).
IDL Syntax ICBCDuration_ptr intervalFromTime(in ICBCTime aTime);
ICBCDuration_ptr intervalFromString(in string aTime);
  In the case with a string parameter, the parameter must be a valid string representation of a time. For details see ICBCTime::initializeFromString.
  If parameters to this function cannot be recognized as a valid time, then a pointer value of −1 is returned.
ICBCTime::isObjectChanged
  Returns a boolean indicating whether the value of this object has been changed since it was initialized.
IDL Syntax
boolean isObjectChanged( );
ICBCTime::lessThan
  Returns TRUE if the time stored in this ICBCTime object is less than the other ICBCTime object.
IDL Syntax
boolean lessThan(in ICBCTime aTime);
ICBCTime::lessThanOrEqualTo
  Returns TRUE if the time stored in this ICBCTime object is less than or equal to the other ICBCTime object.
IDL Syntax
boolean lessThanOrEqualTo(in ICBCTime aTime);
ICBCTime::minute
  Returns the minute part of the time.
IDL Syntax
long minutes;
ICBCTime::notEqualTo
  The opposite of the operator==member.
IDL Syntax
boolean notEqualTo(in ICBCTime aTime);
ICBCTime::second
  Returns the second part of the time.
IDL Syntax
long second( );
ICBCTime::timeOverflow
  Returns the number of overflow or underflow days of a preceding increment or decrement operation. For an increment, returns the number of whole 24 hour periods (days) in the hours value of the result. For a decrement, returns the number of 24 hour periods necessary to restore the hours value of the result to a positive value.
IDL Syntax
long timeOverflow( );
ICBCTimestamp Class
  The class stores the value of a DB2 Timestamp or an Oracle DATE type. All access and manipulation of this timestamp is through a public functional interface. The actual timestamp value is stored in a private attributes.
  A Timestamp attribute in a Component Broker business object that originates from a DB2 database is represented by Component Broker as a 26 character string of form yyyy-mm-dd-hh.mm.ss.mmmmmmm This string can be used to initialize an ICBCTimestamp instance through the ICBC-Timestamp::initializeFromString function. A DATE attribute that originates from an Oracle database is represented by Component Broker in the same 26 character form yyyy-mm-dd-hh.mm.ss.mmmmmm, but with the final six characters (the microseconds field) always set to zeros. This string can be used to initialize an ICBCTimestamp via ICBCTimestamp::initializedFromString. However, Oracle dates earlier than 0001-01-01 are rejected. Whether the ICBCTimestamp object is initialized from data originating in DB2 or in Oracle, ICBCTimestamp applies DB2 semantics in its processing of the data.

IDL Interface Description
interface ICBCTimestamp :IManagedLocal::ILocalOnly
{
// Object initialization
boolean initializeFromString(in string aTimestamp);
boolean initializeFromDateTime(in ICBCDate aDate,
    in ICBCTime aTime,
    in long aMicroseconds);
void initializeFromDate(in ICBCDate aDate); // Equivalent to TIMESTAMP_ISO
void initializeFromTirne(in ICBCTime aTime); // Equivalent to TIMESTAMP_ISO
enum DatastoreType {ORCL};
boolean initializeFromDatastoreFormat(in string aTimestamp,
    in ICBCTimestamp:DatastoreType aDatastore);
// Comparisons
boolean equalTo(in ICBCTimestamp aTimestamp);
boolean notEqualTo(in ICBCTimestamp aTimestamp);
boolean lessThan(in ICBCTimestamp aTimestamp);
boolean lessThanOrEqualTo(in ICBCTimestamp aTimestamp);
boolean greaterThan(in ICBCTimestamp aTimestamp);
boolean greaterThanOrEqualTo(in ICBCTimestamp aTimestamp);
// Query functions
enum OutputFormat {ISO, USA, EUR, JIS, LOC};
// gets whole timestamp as a string:
string formattedString(inout string aOutput);
string getAsDateFormattedString(inout string aTarget,
    in ICBCTimestamp::OutputFormat aFormat);
string getAsTimeFormattedString(inout string aTarget,
    in ICBCTimestamp::OutputFormat aFormat);
string getAsDatastoreFormat(inout string aTarget,
    in ICBCTimestamp::DatastoreType aDatastore);
long microsecond( );
long second( );
long minute( );
long hour( );
long day( );
long month( );
long year( );
long dayOfWeek( );
long dayOfYear( );
long julianDay( );
long modifiedJulianDay( );
string dayName( );
long dayFromString(in string aTimestamp);
long dayOfWeekFromString(in string aTimestamp);
long dayOYearFromString(in string aTimestamp);
long julianDayFromString(in string aTimestamp);
long modifiedJulianDayFromString(in string aTimestamp);
string dayNameFromString(in string aTimestamp);
string dayNameFromNumber(in long aDayIndex);
string monthName( );
long monthFromString(in string aTimestamp);
string monthNameFromString(in string aTimestamp);
string monthNameFromNumber(in long aMonthIndex);
long quarters;
long quarterFromString(in string aTimestamp);
long yearFromString(in string aTimestamp);
boolean isLeapYear(in long aYear);
long daysInObject( );
long daysInString(in string aTimestamp);
long daysInMonth(in long aYear, in long aMonth);
long daysInYear(in long aYear);
boolean isObjectChanged( );
// Manipulation functions

```
void assignFromTimestamp(in ICBCTimestamp
    aTimestamp);
void increment(in ICBCDuration aDuration);
void decrement(in ICBCDuration aDuration);
long timestampOverflow( );
ICBCDuration intervalFromTimestamp(in ICBCTimestamp
    aTimestamp);
ICBCDuration intervalFromString(in string aTimestamp);
};
```
Supported Methods
ICBCTimestamp::_create
ICBCTimestamp::initializeFromString
ICBCTimestamp::initializeFromDateTime
ICBCTimestamp::initalizeFromDate
ICBCTimestamp::initializeFromTime
ICBCTimestamp::equalTo
ICBCTimestamp::notEqualTo
ICBCTimestamp::lessThan
ICBCTimestamp::lessThanOrEqualTo
ICBCTimestamp::greaterThan
ICBCTimestamp::greaterThanOrEqualTo
ICBCTimestamp::formattedString
ICBCTimestamp::microsecond
ICBCTimestamp::second
ICBCTimestamp::minute
ICBCTimestamp::hour
ICBCTimestamp::day
ICBCTimestamp::month
ICBCTimestamp::year
ICBCTimestamp::dayOfWeek
ICBCTimestamp::dayOfYear
ICBCTimestamp::julianDay
ICBCTimestamp::modifiedJulianDay
ICBCTimestamp::dayName
ICBCTimestamp::dayFromString
ICBCTimestamp::dayOfWeekFromString
ICBCTimestamp::dayOfYearFromString
ICBCTimestamp::julianDayFromString
ICBCTimestamp::modifiedJulianDayFromString
ICBCTimestamp::dayNameFromString
ICBCTimestamp::dayNameFromNumber
ICBCTimestamp::monthName
ICBCTimestamp::monthFromString
ICBCTimestamp::monthNameFromString
ICBCTimestamp::monthNameFromNumber
ICBCTimestamp::quarter
ICBCTimestamp::quarterFromString
ICBCTimestamp::yearFromString
ICBCTimestamp::isLeapYear
ICBCTimestamp::daysInObject
ICBCTimestamp::daysInString
ICBCTimestamp::daysInMonth
ICBCTimestamp::daysInYear
ICBCTimestamp::isObjectChanged
ICBCTimestamp::assignFromTimestamp
ICBCTimestamp::increment
ICBCTimestamp::decrement
ICBCTimestamp::timestampOverflow
ICBCTimestamp::interval
ICBCTimestamp::assignFromTimestamp
    Sets all state data in this ICBCTimestamp object equal to the the second ICBCTimestamp object. The change flag of this object is set to TRUE.
IDL Syntax
ICBCTimestamp assignFromTimestamp(in ICBCTimestamp aTimestamp);
ICBCTimestamp::_create
    Returns a pointer to a new ICBCTimestamp object. The object is initialized to today's date and the current local time with a microseconds value of zero.
ICBCTimestamp::day
    Returns the day part of the timestamp.
IDL Syntax
long day( );
ICBCTimestamp::dayFromString
    Returns the day part of the timestamp encoded in the input string parameter. The input string parameter must conform to a format recognizable as a timestamp. Refer to ICBCTimestamp::initializeFromString( ) for a description of supported formats.
    If the input parameter is not recognizable, a value of −1 is returned.
IDL Syntax
long dayFromString(in string aString);
ICBCTimestamp::dayName
    Returns a string containing the name of the day of the week for this timestamp object.
IDL Syntax
long dayName( );
ICBCTimestamp::dayNameFromNumber
    Returns a string containing the name of the day of the week for the day number within a week provided in the input parameter. The input parameter must be a number between 1 and 7. Sunday is day number 1.
    If the input parameter is not recognizable, an empty string is returned.
IDL Syntax
long dayNameFromNumber(in long aDayIndex);
ICBCTimestamp::dayNameFromString
    Returns a string containing the name of the day of the week for the timestamp encoded in the input string parameter. The input string parameter must conform to a format recognizable as a timestamp. Refer to ICBCTimestamp::initializeFromString( ) for a description of supported formats.
    If the input parameter is not recognizable, an empty string is returned.
IDL Syntax
long dayNameFromString(in string aTimestamp);
ICBCTimestamp::dayOfWeek
    Returns a number between 1 and 7 representing the day of the week for this Timestamp object. Sunday is day number 1.
IDL Syntax
long dayOfWeek( );
ICBCTimestamp::dayOfWeekFromString
    Returns a number between 1 and 7 representing the day of the week for the timestamp encoded in the input string parameter. Sunday is day number 1.
    The input string parameter must conform to a format recognizable as a timestamp. Refer to ICBCTimestamp::initializeFromString( ) for a description of supported formats.
    If the input parameter is not recognizable, a value of −1 is returned.
IDL Syntax
long dayOfWeekFromString(in string aString);
ICBCTimestamp::dayOfYear
    Returns a number between 1 and 366 representing the day of the year for this timestamp object. January 1 is day number 1.

IDL Syntax
long dayOfYear( );
ICBCTimestamp::dayOfYearFromString

Returns a number between 1 and 366 representing the day of the year for the timestamp encoded in the input string parameter. January 1 is day number 1.

The input string parameter must conform to a format recognizable as a timestamp. Refer to ICBCTimestamp::initializeFromString( ) for a description of supported formats.

If the input parameter is not recognizable, a value of −1 is returned.
IDL Syntax
long dayOfYearFromString(in string aString);
ICBCTimestamp::daysInObject The result is the number of days from January 1, 0001 to the timestamp represented by this object, plus one day. i.e., an object holding a timestamp for date January 2, 0001 returns the value 2.
IDL Syntax
long daysInObject( );
ICBCTimestamp::daysInMonth Returns the number of days in the month of the year provided in the input parameters. Month number must be between 1 and 12. If the input parameters are not valid, a value of −1 is returned.
IDL Syntax
long daysInMonth(in long aYear, in long aMonth);
ICBCTimestamp::daysInString The result is the number of days from January 1, 0001 to the timestamp represented by the string parameter, plus one day. i.e., an object holding a timestamp for date 00010102 returns the value 2.

If the string is invalid, returns a value of −1.
IDL Syntax
long daysInString(in string aTimestamp);

The input string parameter must conform to a format recognizable as a timestamp. Refer to ICBCTimestamp::initializeFromString( ) for a description of supported formats. If the input parameter is not recognizable, a value of −1 is returned.
ICBCTimestamp::daysInYear Returns the number of days in the year provided in the input parameter. If the input parameter is not valid, a value of −1 is returned. Returns the number of days in the year provided in the input parameter.

If the input parameter is not valid, a value of −1 is returned.
IDL Syntax
long daysInYear(in long aYear);
ICBCTimestamp::decrement Subtracts a ICBCDuration from the value of this ICBCTimestamp object. No value is returned (i.e., this is effectively a−=operator).

Decrementing of a timestamp with a duration (of any type) is carried out on the date and time portions of the timestamp as described for ICBCDate and ICBCTime, except that any underflow of microseconds is satisfied from the seconds portion of the result timestamp, and any underflow of hours is satisfied from the days portion.

If the years value of the result of an decrement operation is less than 0001 years, then the years value of the result is set to 0001, and the number of "underflow" years can be retrieved as a negative number with the dateOverflow( ) function.

The change flag of this object is set to TRUE.

Although an ICBCTimestamp object with an time portion equal to 24.00.00 can be initialized, or returned from an ICBCTimestamp::interval operation, and can be input to an increment or decrement operation, such a timestamp is never be returned as a result of the increment or decrement operation. For the purposes of the calculation, the time portion of the timestamp is considered to be 00.00.00, with the days part incremented by 1. For example, a timestamp value of 1998-11-2-24.00.00.000000 plus or minus a zero duration will return the timestamp result 1998-11-3-00.00.00.000000.
IDL Syntax
void decrement(in ICBCDuration aDuration);
ICBCTimestamp::equalTo Returns TRUE if the date and time this ICBCTimestamp object is equal to the other ICBCTimestamp object.

Note that because of the alternative representations of midnight it is possible to have two different timestamps that actually represent the same point in time, for example: 1997-11-02-24.00.00.000000 and 1997-11-03-00.00.00.000000. ICBCTimestamp compares timestamps by date portion, followed by time portion, and will consider that for timestamp pairs of this type, the timestamp with the higher day part is greater. e.g.: 1997-11-03-00.00.00.000000>1997-11-0224.00.00.000000.
IDL Syntax
boolean equalTo(n ICBCTimestamp aTimestamp);
ICBCTimestamp::formattedString Returns the value of this timestamp object as a string in the form yyyy-mm-dd-hh.mm.ss.mmmmmm.

The application must supply a non-const pointer to a target storage area long enough to receive the formatted timestamp. The function returns a reference to this area, enabling the function to be nested in stream operations.
IDL Syntax
string formattedString(inout string aOutput);
ICBCTimestamp::greaterThan Returns TRUE if the date and time stored in this ICBCTimestamp object is greater than the other ICBCTimestamp object.
IDL Syntax
boolean greaterThan(in ICBCTimestamp aTimestamp);
ICBCTimestamp::greaterThanOrEqualTo Returns TRUE if the date and time stored in this ICBCTimestamp object is greater than or equal to the other ICBCTimestamp object.
IDL Syntax
boolean greaterThanOrEqualTo(in ICBCTimestamp aTimestamp);
ICBCTimestamp::hour Returns the hour part of the timestamp.
IDL Syntax
long hour( );
ICBCTimestamp::increment Adds a ICBCDuration to the value of this ICBCTimestamp object.

Incrementing of a timestamp with a duration (of any type) is carried out on the date and time portions of the timestamp as described for ICBCDate and ICBCTime, except that any overflow of microseconds is carried into the seconds portion of the result timestamp, and any overflow of hours is carried into the days portion.

If the years value of the result of an increment operation is greater than 9999 years, then the years value of the result timestamp is set to 9999, and the number of overflow years can be retrieved using the dateOverflow( ) function.

The change flag of this object is set to TRUE.

Although an ICBCTimestamp object with an time portion equal to 24.00.00 can be initialized, or returned from an ICBCTimestamp::interval operation, and can be input to an increment or decrement operation, such a timestamp is never be returned as a result of the increment or decrement operation. For the purposes of the calculation, the time portion of the In timestamp is considered to be 00.00.00, with the days part incremented by 1. For example, a timestamp value of 1998-11-2-24.00.00.000000 plus or minus a zero duration will return the timestamp result 1998-11-3-00.00.00.000000.

IDL Syntax void increment(in ICBCDuration Duration);

ICBCTimestamp::initializeFromString

Accepts a value for the time in the form of a string. Any existing value in the object is replaced. Returns TRUE if the string is a valid timestamp representation and the object is successfully initialized. Returns FALSE if the parameter is invalid. If FALSE is returned the state of the object is unchanged.

IDL Syntax boolean initializeFromstring(in string aTimestamp);

The string must be in one of two formats:

A character string of length 14 numeric characters, yyyyxxddhhmmss. Leading and trailing blanks are acceptable provided the string length is less than 30 characters. The string must represent a valid date and time. The microseconds portion of the timestamp is set to zero. Only SBCS characters may be present in the string.

A punctuated string of the form yyyy-mm-dd-hh.mm.ss.mmmmmm. Leading and trailing blanks are acceptable provided the string length is less than 30 characters. The string must represent a valid date and time. Leading zeros can be omitted from month, day, and hour. Microseconds can be truncated, or omitted entirely. If omitted, microseconds are set to zero. Only SBCS characters may be present in the string.

ICBCTimestamp::initializeFromDateTime

Initializes this timestamp object from one ICBCDate and one ICBCTime object. The time portion the timestamp takes its value from the ICBCDate and the time portion from the ICBCTime object. The microseconds portion of the timestamp is set to zero.

IDL Syntax boolean initializeFromDateTime(in ICBCDate_ptr a ICBCDate,
    in ICBCTime_ptr a ICBCTime);

ICBCTimestamp::initializeFromDate

Initializes the date part of this timestamp object from the provided ICBCDate parameter. The time portion and the microseconds portion of the timestamp are set to zero.

IDL Syntax void initializeFromDate(in ICBCDate aDate);

ICBCTimestamp::initializeFromTime

Initializes the date portion of this timestamp object to the current date, and the time portion from the provided ICBCTime parameter. The microseconds portion of the timestamp is set to zero.

IDL Syntax void initializeFromTime(in ICBCTime aTime);

ICBCTimestamp::interval

Calculates the Duration between two ICBCTimestamp objects. The result is a pointer to a new ICBCDuration object of type TIMESTAMP.

If the interval between TIMESTAMP1 and TIMESTAMP2 is required, and TIMESTAMP1 is greater than or equal to TIMESTAMP2, the operation is performed by subtracting TIMESTAMP2 from TIMESTAMP1. If, however, TIMESTAMP1 is less than TIMESTAMP2, TIMESTAMP1 is subtracted from TIMESTAMP2, and the sign of the result is made negative. The following procedural description clarifies the steps involved in the operation result=TIMESTAMP1–TIMESTAMP2.

If MICROSECOND(TS2)<=MICROSECOND(TS1)
    then MICROSECOND(RESULT)=MICROSECOND(TS1)–MICROSECOND(TS2).
If MICROSECOND(TS2)>MICROSECOND(TS1)
    then MICROSECOND(RESULT)=1000000+MICROSECOND(TS1)–MICROSECOND(TS2).
    and SECOND(TS2) is incremented by 1.

The seconds and minutes part of the timestamps are subtracted as specified in rules for subtracting ICBCTime.

If HOUR(TS2)<=HOUR(TS1)
    then HOUR(RESULT)=HOUR(TS1)–HOUR(TS2).
IF HOUR(TS2)>HOUR(S1)
    then HOUR(RESULT)=24+HOUR(TS1)–HOUR(TS2)
    and DAY(TS2) is incremented by 1

The date part of the timestamps is subtracted as specified in the rules for subtracting ICBCDate.

IDL Syntax

ICBCDuration_ptr intervalFromTimestamp (in ICBCTimestamp aTimestamp);

ICBCDuration_ptr intervalFromString(in string aTimestamp);

In the case with a string parameter, the parameter must be a valid string representation of a timestamp, in the form yyyy-mm-dd-hh.mm.ss.mmmmmm For details refer to the description of ICBCTimestamp::initializeFromString( ).

If the string parameter to this function cannot be recognized as a valid timestamp, then a pointer value of –1 is returned.

ICBCTimestamp::isLeapYear

Returns TRUE if the year number in the input parameter is a leap year, FALSE otherwise. Year number must be between 1 and 9999.

If the input parameter is not in this range, FALSE is returned.

IDL Syntax boolean isLeapYear(in long aYear);

ICBCTimestamp::isObjectChanged

Returns a boolean indicating whether the the value of this object has been changed since it was initialized.

IDL Syntax boolean isObjectChanged( );

ICBCTimestamp::julianDay

Returns the Julian day number corresponding to noon GMT on the date of this timestamp object. (Julian Day count started at noon, GMT, on January 1 4712 BC.)

IDL Syntax

In, long julianDay( );

ICBCTimestamp::julianDayFromString

Returns the Julian day number corresponding to noon GMT on the timestamp encoded in the input string parameter. (Julian Day count started at noon, GMT, on January 1 4712 BC) The input string parameter must conform to a format recognizable as a timestamp. Refer to ICBCTimestamp::initializeFromString( ) for a description of supported formats.

If the input parameter is not recognizable, a value of –1 is returned.

IDL Syntax long julianDayFromString(in string aString);

ICBCTimestamp::lessThan

Returns TRUE if the date and time stored in this ICBCTimestamp object is less than the other ICBCTimestamp object.

IDL Syntax
boolean lessThan(in ICBCTimestamp aTimestamp);
ICBCTimestamp::lessThanOrEqualTo
  Returns TRUE if the date and time stored in this ICBC-Timestamp object is less than or equal to the other ICBC-Timestamp object.
IDL Syntax
boolean lessThanOrEqualTo(in ICBCTimestamp aTimestamp);
ICBCTimestamp::microsecond
  Returns the microsecond part of the timestamp.
IDL Syntax
long microsecond( );
ICBCTimestamp::minute
  Returns the minute part of the timestamp.
IDL Syntax
long minute( );
ICBCTimestamp::modifiedJulianDay
  Returns the Modified Julian day number (MUD) corresponding to time 00:00:00 GMT on the date of this timestamp object. MJD is defined as Julian Day—2,400,000.5 days. It thus starts at time 00:00:00 (i.e., midnight), in line with normal civil practice, and unlike Julian Day which extends from noon to noon.
IDL Syntax
long modifiedJulianDay( );
ICBCTimestamp::modifiedJulianDayFromString
  Returns the Modified Julian day number (MJD) corresponding to time 00:00:00 GMT on the ID date of the timestamp encoded in the input string parameter. MJD is defined as Julian Day—2,400,000.5 days. It thus starts at time 00:00:00 (i.e., midnight), in line with normal civil practice, and unlike Julian Day which extends from noon to noon. The input string parameter must conform to a format recognizable as a timestamp. Refer to ICBCTimestamp::initializeFromstring( ) for a description of supported formats.
  If the input parameter is not recognizable, a value of −1 is returned.
IDL Syntax
long modifiedJulianDayFromString(in string aString);
ICBCTimestamp::month
  Returns the month pant of the timestamp.
IDL Syntax
long month( );
ICBCTimestamp::monthFromString
  Returns the month part of the timestamp encoded in the input string parameter. The input string parameter must conform to a format recognizable as a timestamp. Refer to ICBCTimestamp::initializeFromString( ) for a description of supported formats.
  If the input parameter is not recognizable, a value of −1 is returned.
IDL Syntax
long monthFromString(in string aString);
ICBCTimestamp::monthName
  Returns a string containing the name of the month of this timestamp object.
IDL Syntax
string monthName( );
ICBCTimestamp::monthNameFromNumber
  Returns a string containing the name of the month for the month number within a year provided in the input parameter. The input parameter must be a number between 1 and 12.
  If the input parameter is not recognizable, an empty string is returned.

IDL Syntax
string monthNameFromNumber(in long aDayIndex);
ICBCTimestamp::monthNameFromString
  Returns a string containing the name of the month for the timestamp encoded in the input string parameter. The input string parameter must conform to a format recognizable as a timestamp. Refer to ICBCTimestamp::initializeFromString( ) for a description of supported formats.
  If the input parameter is not recognizable, an empty string is returned.
IDL Syntax
string monthNameFromString(in string aTimestamp);
ICBCTimestamp::notEqualTo
  The opposite of the operator==member.
IDL Syntax
boolean notEqualTo(in ICBCTimestamp aTimestamp);
ICBCTimestamp::quarter
  Returns a number for the quarter within the year for this timestamp object. timestamps between January 1 and March 31 are in the first quarter, and so on.
IDL Syntax
long quarter( );
ICBCTimestamp::quarterFromString
  Returns a number for the quarter within the year for the timestamp encoded in the input string parameter. The input string parameter must conform to a format recognizable as a timestamp. Refer to ICBCTimestamp::initializedFromString( ) for a description of supported formats. Timestamps between January 1 and March 31 are in the first quarter, and so on.
  If the input parameter is not recognizable, a value of −1 is returned.
IDL Syntax
long quarterFromString(in string aTimestamp);
ICBCTimestamp::second
  Returns the second part of the timestamp.
IDL Syntax
ICBCTimestamp::timestampOverflow
  Returns the number of overflow or underflow years of a preceding increment or decrement operation. For an increment, returns the years in excess of year 9999. For a decrement, returns the number of years less than year 0001.
IDL Syntax
long timestampOverflow( );
ICBCTimestamp::year
  Returns the year part of the timestamp.
IDL Syntax
longYear( );
ICBCTimestamp::yearFromString
  Returns the year part of the timestamp encoded in the input string parameter. The input string parameter must conform to a format recognizable as a timestamp. Refer to ICBCTimestamp::initializeFromString( ) for a description of supported formats.
  If the input parameter is not recognizable, a value of −1 is returned.
IDL Syntax
long yearFromString(in string aString);

What is claimed is:
1. A method for accessing a database, comprising the steps of:
  (a) defining at least one object class in a memory of a computer to match at least one specialized data type stored in the database, wherein at least one method of the object classes produces similar results as equivalent query language expressions for the specialized data types evaluated by a database manager for the database; and

(b) creating at least one instance of the defined object classes in the memory of the computer to manipulate data retrieved from the database that comprise the specialized data types.

2. The method of claim 1 above, wherein the defining step further comprises the step of defining the object classes within a Component Broker.

3. The method of claim 1 above, wherein the methods are selected from a group comprising object initialization, comparisons, query functions, and manipulation functions.

4. The method of claim 1 above, wherein attributes and methods associated with the specialized data type are preserved in the defined object classes.

5. The method of claim 4 above, wherein the methods emulate semantics of the specialized data types.

6. The method of claim 1 above, wherein a public interface of the defined object classes matches characteristics and usage of the specialized data type in the database.

7. The method of claim 1 above, wherein the specialized data types are selected from a group comprising date, decimal, duration, time, and timestamp.

8. The method of claim 1 above, wherein the defined object classes are selected from a group comprising date class, decimal class, duration class, time class, and timestamp class.

9. The method of claim 8 above, wherein the date class stores a calendar date value.

10. The method of claim 8 above, wherein the decimal class stores a decimal value.

11. The method of claim 8 above, wherein the duration class stores a duration value.

12. The method of claim 8 above, wherein the time class stores a time-of-day value.

13. The method of claim 8 above, wherein the timestamp class stores a timestamp value.

14. A computer-implemented system for accessing a database, comprising:
(a) a processor having a memory; and
(b) one or more instructions, performed by the processor, for defining at least one object class in the memory of the processor to match at least one specialized data type stored in the database, wherein at least one member function of the object classes produces similar results as equivalent query language expressions for the specialized data types evaluated by a database manager for the database, and for creating at least one instance of the defined object classes in the memory of the processor to manipulate data retrieved from the database that comprise the specialized data types.

15. The system of claim 14 above, wherein the instructions for defining further comprise instructions for defining the object classes within a Component Broker.

16. The system of claim 15 above, wherein the member functions are selected from a group comprising object initialization, comparisons, query functions, and manipulation functions.

17. The system of claim 14 above, wherein attributes and member functions associated with the specialized data type are preserved in the defined object classes.

18. The system of claim 17 above, wherein the member functions emulate semantics of the specialized data types.

19. The system of claim 14 above, wherein a public interface of the defined object classes matches characteristics and usage of the specialized data type in the database.

20. The system of claim 14 above, wherein the specialized data types are selected from a group comprising date, decimal, duration, time, and timestamp.

21. The system of claim 14 above, wherein the defined object classes are selected from a group comprising date class, decimal class, duration class, time class, and timestamp class.

22. The system of claim 21 above, wherein the date class stores a calendar date value.

23. The system of claim 21 above, wherein the decimal class stores a decimal value.

24. The system of claim 21 above, wherein the duration class stores a duration value.

25. The system of claim 21 above, wherein the time class stores a time-of-day value.

26. The system of claim 21 above, wherein the timestamp class stores a timestamp value.

27. An article of manufacture comprising a carrier embodying logic for accessing a database, the method comprising the steps of:
(a) defining at least one object class in a memory of a computer to match at least one specialized data type stored in the database, wherein at least one method of the object classes produces similar results as equivalent query language expressions for the specialized data types evaluated by a database manager for the database; and
(b) creating at least one instance of the defined object classes in the memory of the computer to manipulate data retrieved from the database that comprise the specialized data types.

28. The method of claim 27 above, wherein the defining step further comprises the step of defining the object classes within a Component Broker.

29. The method of claim 27 above, wherein the methods are selected from a group comprising object initialization, comparisons, query functions, and manipulation functions.

30. The method of claim 27 above, wherein attributes and methods associated with the specialized data type are preserved in the defined object classes.

31. The method of claim 30 above, wherein the methods emulate semantics of the specialized data types.

32. The method of claim 27 above, wherein a public interface of the defined object classes matches characteristics and usage of the specialized data type in the database.

33. The method of claim 27 above, wherein the specialized data types are selected from a group comprising date, decimal, duration, time, and timestamp.

34. The method of claim 27 above, wherein the defined object classes are selected from a group comprising date class, decimal class, duration class, time class, and timestamp class.

35. The method of claim 34 above, wherein the date class stores a calendar date value.

36. The method of claim 34 above, wherein the decimal class stores a decimal value.

37. The method of claim 34 above, wherein the duration class stores a duration value.

38. The method of claim 34 above, wherein the time class stores a time-of-day value.

39. The method of claim 34 above, wherein the timestamp class stores a timestamp value.

* * * * *